United States Patent
Min et al.

(10) Patent No.: US 12,451,523 B2
(45) Date of Patent: *Oct. 21, 2025

(54) RIVETING STRUCTURE OF ELECTRODE TERMINAL, AND CYLINDRICAL BATTERY CELL, BATTERY PACK AND VEHICLE INCLUDING THE SAME

(71) Applicant: LG ENERGY SOLUTION, LTD., Seoul (KR)

(72) Inventors: Geon-Woo Min, Daejeon (KR); Min-Ki Jo, Daejeon (KR); Do-Gyun Kim, Daejeon (KR); Jae-Woong Kim, Daejeon (KR); Kwang-Su Hwangbo, Daejeon (KR); Jong-Sik Park, Daejeon (KR); Jae-Won Lim, Daejeon (KR); Yu-Sung Choe, Daejeon (KR); Hak-Kyun Kim, Daejeon (KR); Je-Jun Lee, Daejeon (KR); Byoung-Gu Lee, Daejeon (KR); Duk-Hyun Ryu, Daejeon (KR); Kwan-Hee Lee, Daejeon (KR); Jae-Eun Lee, Daejeon (KR); Hae-Jin Lim, Daejeon (KR); Su-Ji Choi, Daejeon (KR); Bo-Hyun Kang, Daejeon (KR); Ji-Min Jung, Daejeon (KR); Jin-Hak Kong, Daejeon (KR); Soon-O Lee, Daejeon (KR); Kyu-Hyun Choi, Daejeon (KR); Pil-Kyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,402

(22) Filed: Dec. 21, 2022

(65) Prior Publication Data
US 2023/0130340 A1    Apr. 27, 2023

Related U.S. Application Data

(63) Continuation of application No. 17/592,576, filed on Feb. 4, 2022.

(30) Foreign Application Priority Data

Feb. 19, 2021  (KR) ........................ 10-2021-0022881
Feb. 19, 2021  (KR) ........................ 10-2021-0022891
(Continued)

(51) Int. Cl.
*H01M 10/0587*   (2010.01)
*H01M 4/64*      (2006.01)
(Continued)

(52) U.S. Cl.
CPC ........ *H01M 10/0587* (2013.01); *H01M 4/64* (2013.01); *H01M 4/70* (2013.01);
(Continued)

(58) Field of Classification Search
CPC ............ H01M 50/188; H01M 50/184; H01M 50/179; H01M 50/559; H01M 50/567;
(Continued)

(56) References Cited

U.S. PATENT DOCUMENTS 3,503,806 A   3/1970  Sugalski
3,761,314 A   9/1973  Cailley
(Continued)

FOREIGN PATENT DOCUMENTS

CN   1170782 A   1/1998
CN   1407642 A   4/2003
(Continued)

OTHER PUBLICATIONS

Full English Translation of Japanese Patent Application No. 2002-289170-A dated Oct. 4, 2002.
(Continued)

*Primary Examiner* — Ula C Ruddock
*Assistant Examiner* — Sarika Gupta
(74) *Attorney, Agent, or Firm* — Birch, Stewart, Kolasch & Birch, LLP

(57) ABSTRACT

The riveting structure of an electrode terminal for a battery includes a battery housing having a bottom; an electrode
(Continued)

US 12,451,523 B2

Page 2 terminal riveted through a hole formed in the bottom of the battery housing; and a gasket between the electrode terminal and the battery housing. Also, the electrode terminal includes a body portion inserted into the hole; an outer flange portion extending along an outer surface of the bottom of the battery housing from a first side of the body portion exposed through the outer surface; an inner flange portion extending toward an inner surface of the bottom of the battery housing from a second side of the body portion exposed through the inner surface; and a flat portion on the second side of the body portion.

31 Claims, 18 Drawing Sheets

(30) Foreign Application Priority Data

| Date | | |
|---|---|---|
| Feb. 19, 2021 | (KR) | 10-2021-0022894 |
| Feb. 19, 2021 | (KR) | 10-2021-0022897 |
| Feb. 23, 2021 | (KR) | 10-2021-0024424 |
| Mar. 8, 2021 | (KR) | 10-2021-0030291 |
| Mar. 8, 2021 | (KR) | 10-2021-0030300 |
| Apr. 9, 2021 | (KR) | 10-2021-0046798 |
| May 4, 2021 | (KR) | 10-2021-0058183 |
| Jun. 14, 2021 | (KR) | 10-2021-0077046 |
| Jun. 28, 2021 | (KR) | 10-2021-0084326 |
| Oct. 1, 2021 | (KR) | 10-2021-0131205 |
| Oct. 1, 2021 | (KR) | 10-2021-0131207 |
| Oct. 1, 2021 | (KR) | 10-2021-0131208 |
| Oct. 1, 2021 | (KR) | 10-2021-0131215 |
| Oct. 1, 2021 | (KR) | 10-2021-0131225 |
| Oct. 14, 2021 | (KR) | 10-2021-0137001 |
| Oct. 15, 2021 | (KR) | 10-2021-0137856 |
| Oct. 22, 2021 | (KR) | 10-2021-0142196 |
| Nov. 9, 2021 | (KR) | 10-2021-0153472 |
| Nov. 19, 2021 | (KR) | 10-2021-0160823 |
| Nov. 24, 2021 | (KR) | 10-2021-0163809 |
| Nov. 26, 2021 | (KR) | 10-2021-0165866 |
| Dec. 3, 2021 | (KR) | 10-2021-0172446 |
| Dec. 10, 2021 | (KR) | 10-2021-0177091 |
| Dec. 31, 2021 | (KR) | 10-2021-0194572 |
| Dec. 31, 2021 | (KR) | 10-2021-0194593 |
| Dec. 31, 2021 | (KR) | 10-2021-0194610 |
| Dec. 31, 2021 | (KR) | 10-2021-0194611 |
| Dec. 31, 2021 | (KR) | 10-2021-0194612 |
| Jan. 5, 2022 | (KR) | 10-2022-0001802 |

(51) Int. Cl.

| | |
|---|---|
| *H01M 4/70* | (2006.01) |
| *H01M 50/107* | (2021.01) |
| *H01M 50/152* | (2021.01) |
| *H01M 50/179* | (2021.01) |
| *H01M 50/183* | (2021.01) |
| *H01M 50/188* | (2021.01) |
| *H01M 50/213* | (2021.01) |
| *H01M 50/242* | (2021.01) |
| *H01M 50/507* | (2021.01) |
| *H01M 50/509* | (2021.01) |
| *H01M 50/531* | (2021.01) |
| *H01M 50/533* | (2021.01) |
| *H01M 50/536* | (2021.01) |
| *H01M 50/55* | (2021.01) |
| *H01M 50/559* | (2021.01) |
| *H01M 50/567* | (2021.01) |

(52) U.S. Cl.
CPC ....... *H01M 50/107* (2021.01); *H01M 50/152* (2021.01); *H01M 50/179* (2021.01); *H01M 50/183* (2021.01); *H01M 50/188* (2021.01); *H01M 50/213* (2021.01); *H01M 50/242* (2021.01); *H01M 50/507* (2021.01); *H01M 50/509* (2021.01); *H01M 50/531* (2021.01); *H01M 50/533* (2021.01); *H01M 50/536* (2021.01); *H01M 50/55* (2021.01); *H01M 50/559* (2021.01); *H01M 50/567* (2021.01); *H01M 2220/20* (2013.01)

(58) Field of Classification Search
CPC ...... H01M 10/0587; H01M 4/64; H01M 4/70; H01M 50/107; H01M 50/152; H01M 50/183; H01M 50/213; H01M 50/242; H01M 50/507; H01M 50/509; H01M 50/531; H01M 50/533; H01M 50/536; H01M 50/55; H01M 2220/20; H01M 2200/103; H01M 50/538; H01M 50/545; H01M 50/583; H01M 50/586; H01M 50/593; Y02E 60/10; Y02P 70/50
See application file for complete search history.

(56) References Cited

U.S. PATENT DOCUMENTS

| | | | |
|---|---|---|---|
| 4,049,883 A | 9/1977 | Schenk et al. | |
| 4,053,687 A | 10/1977 | Coibion et al. | |
| 4,322,484 A | 3/1982 | Sugalski | |
| 4,563,551 A * | 1/1986 | Black, III | H01H 11/06 |
| | | | 200/284 |
| 5,576,113 A | 11/1996 | Hirofumi et al. | |
| 5,665,483 A | 9/1997 | Saito et al. | |
| 5,770,332 A | 6/1998 | Narukawa et al. | |
| 5,849,431 A | 12/1998 | Kita et al. | |
| 6,132,900 A | 10/2000 | Yoshizawa et al. | |
| 6,399,237 B1 | 6/2002 | Souliac et al. | |
| 6,451,473 B1 | 9/2002 | Saito et al. | |
| 6,653,017 B2 | 11/2003 | Satoh et al. | |
| 6,677,082 B2 | 1/2004 | Thackeray et al. | |
| 6,680,143 B2 | 1/2004 | Thackeray et al. | |
| 7,273,678 B2 | 9/2007 | Akita et al. | |
| 7,351,496 B2 | 4/2008 | Nakanishi et al. | |
| 8,007,549 B2 | 8/2011 | Ligeois et al. | |
| 8,580,425 B2 | 11/2013 | Kim | |
| 9,496,539 B2 | 11/2016 | Tyler et al. | |
| 9,496,557 B2 | 11/2016 | Fuhr et al. | |
| 10,840,555 B2 | 11/2020 | Iwama et al. | |
| 2001/0004505 A1 | 6/2001 | Kim et al. | |
| 2001/0051297 A1 | 12/2001 | Nemoto et al. | |
| 2001/0053477 A1 | 12/2001 | Kitoh et al. | |
| 2002/0058184 A1* | 5/2002 | Hayashi | H01M 50/176 |
| | | | 429/180 |
| 2002/0061435 A1 | 5/2002 | Hisai | |
| 2002/0110729 A1 | 8/2002 | Hozumi et al. | |
| 2003/0035993 A1 | 2/2003 | Enomoto et al. | |
| 2003/0049536 A1 | 3/2003 | Wiepen | |
| 2003/0064285 A1 | 4/2003 | Kawamura et al. | |
| 2003/0104276 A1 | 6/2003 | Mizuno et al. | |
| 2004/0023108 A1 | 2/2004 | Nakanishi et al. | |
| 2004/0131930 A1 | 7/2004 | Nakanishi et al. | |
| 2005/0048365 A1 | 3/2005 | Miyahisa et al. | |
| 2005/0058184 A1* | 3/2005 | Paul | H04L 7/0029 |
| | | | 375/148 |
| 2005/0118499 A1 | 6/2005 | Kim | |
| 2005/0142436 A1 | 6/2005 | Arai et al. | |
| 2005/0158620 A1 | 7/2005 | Kim et al. | |
| 2005/0181272 A1 | 8/2005 | Kim | |
| 2005/0214640 A1 | 9/2005 | Kim | |
| 2005/0238951 A1 | 10/2005 | Yoo et al. | |
| 2005/0260487 A1 | 11/2005 | Kim et al. | |
| 2005/0260489 A1 | 11/2005 | Kim | |
| 2005/0287428 A1 | 12/2005 | Cheon et al. | |

(56) References Cited

U.S. PATENT DOCUMENTS

| | | |
|---|---|---|
| 2005/0287432 A1 | 12/2005 | Cheon et al. |
| 2006/0024574 A1 | 2/2006 | Yim et al. |
| 2006/0063063 A1 | 3/2006 | Mori et al. |
| 2006/0204841 A1 | 9/2006 | Satoh et al. |
| 2008/0026293 A1 | 1/2008 | Marple et al. |
| 2008/0038629 A1 | 2/2008 | Okabe et al. |
| 2008/0057394 A1 | 3/2008 | Rigobert et al. |
| 2008/0145756 A1 | 6/2008 | Taniguichi |
| 2008/0182159 A1 | 7/2008 | Mitani et al. |
| 2008/0254354 A1 | 10/2008 | Adams |
| 2009/0011329 A1 | 1/2009 | Yoon |
| 2009/0104520 A1 | 4/2009 | Marple |
| 2009/0136835 A1 | 5/2009 | Nakai et al. |
| 2009/0208830 A1 | 8/2009 | Okabe et al. |
| 2009/0208836 A1 | 8/2009 | Fuhr et al. |
| 2009/0239133 A1 | 9/2009 | Kosugi |
| 2009/0280406 A1 | 11/2009 | Kozuki |
| 2009/0311583 A1 | 12/2009 | Wu |
| 2010/0035140 A1 | 2/2010 | Miyahisa et al. |
| 2010/0055548 A1 | 3/2010 | Matsumoto et al. |
| 2010/0081052 A1 | 4/2010 | Morishima et al. |
| 2010/0112434 A1 | 5/2010 | Akou et al. |
| 2010/0129716 A1 | 5/2010 | Kato et al. |
| 2010/0151317 A1 | 6/2010 | Kim et al. |
| 2010/0159308 A1 | 6/2010 | Kim et al. |
| 2010/0216001 A1 | 8/2010 | Byun et al. |
| 2010/0255358 A1 | 10/2010 | Yoneyama |
| 2010/0266893 A1 | 10/2010 | Martin et al. |
| 2010/0316897 A1 | 12/2010 | Kozuki et al. |
| 2010/0330414 A1 | 12/2010 | Mori |
| 2011/0027644 A1 | 2/2011 | Kiyama |
| 2011/0067227 A1 | 3/2011 | Sohn |
| 2011/0086610 A1 | 4/2011 | Baldwin et al. |
| 2011/0171508 A1 | 7/2011 | Kim |
| 2011/0256433 A1 | 10/2011 | Fuhr et al. |
| 2011/0274953 A1 | 11/2011 | Hato et al. |
| 2011/0281155 A1 | 11/2011 | Ito et al. |
| 2011/0300444 A1 | 12/2011 | Nakamura |
| 2012/0058375 A1 | 3/2012 | Tanaka et al. |
| 2012/0094169 A1 | 4/2012 | Kim et al. |
| 2012/0100419 A1 | 4/2012 | Byun et al. |
| 2012/0231641 A1 | 9/2012 | Sugai et al. |
| 2012/0297611 A1 | 11/2012 | Ma |
| 2012/0328932 A1 | 12/2012 | Guen et al. |
| 2013/0136977 A1 | 5/2013 | Masuda |
| 2013/0183556 A1 | 7/2013 | Kim |
| 2013/0209849 A1 | 8/2013 | Hattori et al. |
| 2013/0273401 A1 | 10/2013 | Lee et al. |
| 2013/0323574 A1 | 12/2013 | Tsunaki et al. |
| 2014/0079971 A1 | 3/2014 | Huang |
| 2014/0113185 A1 | 4/2014 | Mori et al. |
| 2014/0162097 A1 | 6/2014 | Fuhr et al. |
| 2014/0186692 A1 | 7/2014 | Kim et al. |
| 2014/0205868 A1 | 7/2014 | Phillips |
| 2014/0212695 A1 | 7/2014 | Lane et al. |
| 2014/0234676 A1 | 8/2014 | Tyler et al. |
| 2014/0255748 A1 | 9/2014 | Jan et al. |
| 2015/0004446 A1 | 1/2015 | Kim et al. |
| 2015/0104694 A1 | 4/2015 | Okuda et al. |
| 2015/0140379 A1 | 5/2015 | Yau |
| 2015/0155532 A1 | 6/2015 | Harayama et al. |
| 2016/0043373 A1 | 2/2016 | Arishima et al. |
| 2016/0098451 A1 | 4/2016 | Murai et al. |
| 2016/0141589 A1 | 5/2016 | Kang et al. |
| 2016/0155998 A1 | 6/2016 | Wakimoto et al. |
| 2016/0156037 A1 | 6/2016 | Mizuno |
| 2016/0181577 A1 | 6/2016 | Kajiwara et al. |
| 2016/0226056 A1 | 8/2016 | Masson et al. |
| 2016/0329542 A1 | 11/2016 | Tyler et al. |
| 2017/0018750 A1 | 1/2017 | Wintner |
| 2017/0047575 A1 | 2/2017 | Tsuji et al. |
| 2017/0062789 A1 | 3/2017 | Sim et al. |
| 2017/0149042 A1 | 5/2017 | Koo et al. |
| 2017/0187068 A1 | 6/2017 | Morisawa et al. |
| 2017/0200935 A1 | 7/2017 | Hong et al. |
| 2017/0256769 A1 | 9/2017 | Wynn et al. |
| 2017/0338462 A1 | 11/2017 | Imre |
| 2017/0372848 A1 | 12/2017 | Yoon et al. |
| 2018/0062123 A1 | 3/2018 | Ikeda et al. |
| 2018/0123143 A1 | 5/2018 | Sato et al. |
| 2018/0130995 A1 | 5/2018 | Nemoto et al. |
| 2018/0182560 A1 | 6/2018 | Khakhalev |
| 2018/0205044 A1 | 7/2018 | Urushihara |
| 2018/0219208 A1 | 8/2018 | Dewulf et al. |
| 2018/0247773 A1 | 8/2018 | Lee |
| 2018/0375162 A1 | 12/2018 | Wakimoto et al. |
| 2019/0006639 A1 | 1/2019 | Ito |
| 2019/0081294 A1 | 3/2019 | Capati et al. |
| 2019/0148683 A1 | 5/2019 | Kwon et al. |
| 2019/0221791 A1 | 7/2019 | Wakimoto |
| 2019/0252667 A1 | 8/2019 | Moriyama et al. |
| 2019/0280256 A1 | 9/2019 | Baik et al. |
| 2019/0296283 A1 | 9/2019 | Chen et al. |
| 2019/0341201 A1 | 11/2019 | Chami et al. |
| 2019/0379019 A1 | 12/2019 | Fukuda et al. |
| 2019/0379028 A1 | 12/2019 | Lim et al. |
| 2019/0386272 A1 | 12/2019 | Shin et al. |
| 2020/0044289 A1 | 2/2020 | Pasma et al. |
| 2020/0083492 A1 | 3/2020 | Koshiol et al. |
| 2020/0119328 A1 | 4/2020 | Zheng et al. |
| 2020/0127249 A1 | 4/2020 | Yoon et al. |
| 2020/0144581 A1 | 5/2020 | Thunot |
| 2020/0144676 A1 | 5/2020 | Tsuruta et al. |
| 2020/0203773 A1 | 6/2020 | Fujita et al. |
| 2020/0212374 A1 | 7/2020 | Gaugler |
| 2020/0235369 A1 | 7/2020 | Jeong et al. |
| 2020/0295341 A1 | 9/2020 | Kim et al. |
| 2020/0365838 A1 | 11/2020 | Chen |
| 2020/0373546 A1 | 11/2020 | Li et al. |
| 2020/0388856 A1 | 12/2020 | Hayashi |
| 2021/0021007 A1 | 1/2021 | Park et al. |
| 2021/0039195 A1 | 2/2021 | Jost et al. |
| 2021/0075051 A1 | 3/2021 | Zhou |
| 2021/0167467 A1 | 6/2021 | Yang et al. |
| 2021/0210792 A1 | 7/2021 | Mukai et al. |
| 2021/0257652 A1 | 8/2021 | Ko et al. |
| 2021/0273298 A1 | 9/2021 | Babinot et al. |
| 2021/0278479 A1 | 9/2021 | Park et al. |
| 2021/0280835 A1 | 9/2021 | Peng et al. |
| 2021/0344033 A1 | 11/2021 | Park et al. |
| 2021/0376333 A1 | 12/2021 | Shiozaki et al. |
| 2022/0037712 A1 | 2/2022 | Kritzer et al. |
| 2022/0037747 A1 | 2/2022 | Lee |
| 2022/0069335 A1 | 3/2022 | Kim |
| 2022/0094021 A1 | 3/2022 | Ishikawa |
| 2022/0123444 A1 | 4/2022 | Liu et al. |
| 2022/0271344 A1 | 8/2022 | Choi et al. |
| 2022/0271402 A1 | 8/2022 | Lim et al. |
| 2023/0091100 A1 | 3/2023 | Tsushima et al. |
| 2023/0123195 A1 | 4/2023 | Fang et al. |
| 2024/0356123 A1 | 10/2024 | Ko et al. |

FOREIGN PATENT DOCUMENTS

| | | |
|---|---|---|
| CN | 1426609 A | 6/2003 |
| CN | 1444303 A | 9/2003 |
| CN | 1495943 A | 5/2004 |
| CN | 2681364 Y | 2/2005 |
| CN | 1700495 A | 11/2005 |
| CN | 1832228 A | 9/2006 |
| CN | 1309105 C | 4/2007 |
| CN | 101010818 A | 7/2007 |
| CN | 101026248 A | 8/2007 |
| CN | 100349321 C | 11/2007 |
| CN | 101083317 A | 12/2007 |
| CN | 200990393 Y | 12/2007 |
| CN | 201066701 Y | 5/2008 |
| CN | 201117731 Y | 9/2008 |
| CN | 101288572 A | 10/2008 |
| CN | 100468827 C | 3/2009 |
| CN | 101404338 A | 4/2009 |
| CN | 101501884 A | 8/2009 |
| CN | 201466087 U | 5/2010 |
| CN | 101188311 B | 9/2010 |

(56) References Cited

FOREIGN PATENT DOCUMENTS

| | | |
|---|---|---|
| CN | 201638890 U | 11/2010 |
| CN | 201725845 U | 1/2011 |
| CN | 201781028 U | 3/2011 |
| CN | 202423400 U | 9/2012 |
| CN | 103155222 A | 6/2013 |
| CN | 103280543 A | 9/2013 |
| CN | 103427063 A | 12/2013 |
| CN | 203553261 U | 4/2014 |
| CN | 103797611 A | 5/2014 |
| CN | 203987145 U | 11/2014 |
| CN | 104396044 A | 3/2015 |
| CN | 204230370 U | 3/2015 |
| CN | 204596910 U | 8/2015 |
| CN | 204885267 U | 12/2015 |
| CN | 105449291 A | 3/2016 |
| CN | 105655623 A | 6/2016 |
| CN | 106030855 A | 10/2016 |
| CN | 106159350 A | 11/2016 |
| CN | 205863251 U | 1/2017 |
| CN | 106463654 A | 2/2017 |
| CN | 206250283 U | 6/2017 |
| CN | 106935746 A | 7/2017 |
| CN | 107112597 A | 8/2017 |
| CN | 206461019 U | 9/2017 |
| CN | 206471426 U | 9/2017 |
| CN | 208481044 U | 9/2017 |
| CN | 104488113 B | 10/2017 |
| CN | 107275524 A | 10/2017 |
| CN | 208819838 U | 11/2017 |
| CN | 107431215 A | 12/2017 |
| CN | 107482156 A | 12/2017 |
| CN | 107851769 A | 3/2018 |
| CN | 207217854 U | 4/2018 |
| CN | 108063192 A | 5/2018 |
| CN | 207381468 U | 5/2018 |
| CN | 108496269 A | 9/2018 |
| CN | 108695451 A | 10/2018 |
| CN | 208400966 U | 1/2019 |
| CN | 110048065 A | 7/2019 |
| CN | 209133626 U | 7/2019 |
| CN | 209328958 U | 8/2019 |
| CN | 110247058 A | 9/2019 |
| CN | 110459705 A | 11/2019 |
| CN | 110476273 A | 11/2019 |
| CN | 110581235 A | 12/2019 |
| CN | 209912959 U | 1/2020 |
| CN | 110870099 A | 3/2020 |
| CN | 111033807 A | 4/2020 |
| CN | 111446386 A | 7/2020 |
| CN | 211208547 U | 8/2020 |
| CN | 111668534 A | 9/2020 |
| CN | 111834557 A | 10/2020 |
| CN | 111952525 A | 11/2020 |
| CN | 211879534 U | 11/2020 |
| CN | 212182379 U | 12/2020 |
| CN | 212303743 U | 1/2021 |
| CN | 112310574 A | 2/2021 |
| CN | 112335075 A | 2/2021 |
| CN | 212907981 U | 4/2021 |
| CN | 112909445 A | 6/2021 |
| CN | 113193165 A | 7/2021 |
| CN | 113346201 A | 9/2021 |
| CN | 214378637 U | 10/2021 |
| CN | 215342666 U | 12/2021 |
| CN | 114865242 A | 8/2022 |
| CN | 217239523 U | 8/2022 |
| CN | 217239536 U | 8/2022 |
| CN | 109119674 B | 7/2024 |
| CO | 209822778 U | 12/2019 |
| DE | 10 2018 130 173 A1 | 5/2020 |
| EP | 1 596 450 A2 | 11/2005 |
| EP | 2677592 A1 | 12/2013 |
| EP | 2 728 647 A1 | 5/2014 |
| EP | 2 876 338 A1 | 5/2015 |
| EP | 2 924 762 A2 | 9/2015 |
| EP | 2 160 777 B1 | 3/2019 |
| EP | 3 739 669 A1 | 11/2020 |
| EP | 3 748 728 A1 | 12/2020 |
| EP | 4 087 034 A1 | 11/2022 |
| EP | 4 290 630 A1 | 12/2023 |
| EP | 4 293 802 A1 | 12/2023 |
| EP | 3 739 652 B1 | 3/2024 |
| EP | 4 336 649 A1 | 3/2024 |
| EP | 4 418 379 A1 | 8/2024 |
| EP | 4 421 970 A1 | 8/2024 |
| GB | 1191105 A | 5/1970 |
| GB | 1 332 944 A | 10/1973 |
| GB | 2564670 A | 1/2019 |
| JP | 48-34834 Y2 | 10/1973 |
| JP | 62-7157 U | 1/1987 |
| JP | 6-124696 A | 5/1994 |
| JP | 7-201309 A | 8/1995 |
| JP | 8-22818 A | 1/1996 |
| JP | 8-102313 A | 4/1996 |
| JP | 10-83833 A | 3/1998 |
| JP | 10-92469 A | 4/1998 |
| JP | 10-108532 A | 4/1998 |
| JP | 10-214609 A | 8/1998 |
| JP | 10-228908 A | 8/1998 |
| JP | 11-67279 A | 3/1999 |
| JP | 11-144690 A | 5/1999 |
| JP | 11-176447 A | 7/1999 |
| JP | 11-219720 A | 8/1999 |
| JP | 11-297301 A | 10/1999 |
| JP | 2955135 B2 | 10/1999 |
| JP | 11-329398 A | 11/1999 |
| JP | 2000-58024 A | 2/2000 |
| JP | 2000-243433 A | 9/2000 |
| JP | 2000-260417 A | 9/2000 |
| JP | 2001-15098 A | 1/2001 |
| JP | 2001-28274 A | 1/2001 |
| JP | 2001-43844 A | 2/2001 |
| JP | 2001-52756 A | 2/2001 |
| JP | 2001-148238 A | 5/2001 |
| JP | 2001-256954 A | 9/2001 |
| JP | 3252846 B2 | 2/2002 |
| JP | 2002-141099 A | 5/2002 |
| JP | 2002-157991 A | 5/2002 |
| JP | 2002-289170 A | 10/2002 |
| JP | 2003-100279 A | 4/2003 |
| JP | 2003-115285 A | 4/2003 |
| JP | 2003-203621 A | 7/2003 |
| JP | 2004-14173 A | 1/2004 |
| JP | 2004-95487 A | 3/2004 |
| JP | 2004-111362 A | 4/2004 |
| JP | 2004-247192 A | 9/2004 |
| JP | 2004-253253 A | 9/2004 |
| JP | 3588264 B2 | 11/2004 |
| JP | 2004-362956 A | 12/2004 |
| JP | 3632586 B2 | 3/2005 |
| JP | 2005-100927 A | 4/2005 |
| JP | 2005-129433 A | 5/2005 |
| JP | 2005-166664 A | 6/2005 |
| JP | 2005-278840 A | 10/2005 |
| JP | 3718872 B2 | 11/2005 |
| JP | 3751782 B2 | 3/2006 |
| JP | 2006-120606 A | 5/2006 |
| JP | 2006-278016 A | 10/2006 |
| JP | 2007-18962 A | 1/2007 |
| JP | 3906519 B2 | 1/2007 |
| JP | 2007-234486 A | 9/2007 |
| JP | 2007-335156 A | 12/2007 |
| JP | 2008-66302 A | 3/2008 |
| JP | 2008-123848 A | 5/2008 |
| JP | 2008-192552 A | 8/2008 |
| JP | 2008-243811 A | 10/2008 |
| JP | 2009-104925 A | 5/2009 |
| JP | 2009-110885 A | 5/2009 |
| JP | 2009-123438 A | 6/2009 |
| JP | 2009-176449 A | 8/2009 |
| JP | 4346637 B2 | 10/2009 |
| JP | 2009-259452 A | 11/2009 |
| JP | 2009-289672 A | 12/2009 |
| JP | 2010-10117 A | 1/2010 |

(56) References Cited

FOREIGN PATENT DOCUMENTS

| | | |
|---|---|---|
| JP | 4401634 B2 | 1/2010 |
| JP | 2010-33940 A | 2/2010 |
| JP | 2010-61892 A | 3/2010 |
| JP | 4430587 B2 | 3/2010 |
| JP | 2010-80392 A | 4/2010 |
| JP | 2010-135304 A | 6/2010 |
| JP | 4501361 B2 | 7/2010 |
| JP | 2010-529624 A | 8/2010 |
| JP | 2011-113845 A | 6/2011 |
| JP | 2011-159582 A | 8/2011 |
| JP | 2011-216297 A | 10/2011 |
| JP | 2012-74359 A | 4/2012 |
| JP | 2012-510143 A | 4/2012 |
| JP | 2012-134108 A | 7/2012 |
| JP | 2012-160658 A | 8/2012 |
| JP | 5019557 B2 | 9/2012 |
| JP | 5030379 B2 | 9/2012 |
| JP | 2012-190739 A | 10/2012 |
| JP | 5051410 B2 | 10/2012 |
| JP | 2013-246966 A | 12/2013 |
| JP | 2014-41791 A | 3/2014 |
| JP | 2014-132552 A | 7/2014 |
| JP | 5651536 B2 | 1/2015 |
| JP | 2015-106613 A | 6/2015 |
| JP | 2015-185517 A | 10/2015 |
| JP | 5796623 B2 | 10/2015 |
| JP | 2015-222685 A | 12/2015 |
| JP | 5877724 B2 | 3/2016 |
| JP | 2016-100323 A | 5/2016 |
| JP | 2016-115422 A | 6/2016 |
| JP | 2016-195014 A | 11/2016 |
| JP | 2016-195025 A | 11/2016 |
| JP | 2016-195036 A | 11/2016 |
| JP | 2016-225014 A | 12/2016 |
| JP | 2017-143004 A | 8/2017 |
| JP | 6250567 B2 | 12/2017 |
| JP | 2018-507544 A | 3/2018 |
| JP | 2018-092776 A | 6/2018 |
| JP | 5935878 B2 | 6/2018 |
| JP | 2018-525781 A | 9/2018 |
| JP | 2018-163765 A | 10/2018 |
| JP | 6406836 B2 | 10/2018 |
| JP | 2019-46639 A | 3/2019 |
| JP | WO2019/194182 A1 | 10/2019 |
| JP | 2020-71898 A | 5/2020 |
| JP | 2020-0171898 A | 5/2020 |
| JP | 6735445 B2 | 8/2020 |
| JP | 2020-527841 A | 9/2020 |
| JP | 2020-202038 A | 12/2020 |
| JP | WO 2020/171426 A1 | 12/2020 |
| KR | 2000-0051436 A | 8/2000 |
| KR | 2001-0017098 A | 3/2001 |
| KR | 10-2001-0038811 A | 5/2001 |
| KR | 2001-0056363 A | 7/2001 |
| KR | 10-0490526 B1 | 8/2005 |
| KR | 10-2005-0110460 A | 11/2005 |
| KR | 10-2005-0121904 A | 12/2005 |
| KR | 10-2005-0121914 A | 12/2005 |
| KR | 10-0551885 B1 | 2/2006 |
| KR | 10-2006-0022128 A | 3/2006 |
| KR | 10-0612236 B1 | 8/2006 |
| KR | 10-2006-0111837 A | 10/2006 |
| KR | 10-2007-0033762 A | 3/2007 |
| KR | 10-0709870 B1 | 4/2007 |
| KR | 10-2008-0047165 A | 5/2008 |
| KR | 10-2009-0003702 A | 1/2009 |
| KR | 10-2010-0068080 A | 6/2010 |
| KR | 10-2010-0075177 A | 7/2010 |
| KR | 10-2010-0089092 A | 8/2010 |
| KR | 10-2010-0096100 A | 9/2010 |
| KR | 10-1023865 B1 | 3/2011 |
| KR | 10-1147175 B1 | 5/2012 |
| KR | 10-1265199 B1 | 5/2013 |
| KR | 10-2013-0084086 A | 7/2013 |
| KR | 10-1320581 B1 | 10/2013 |
| KR | 10-1446151 B1 | 10/2014 |
| KR | 10-1514827 B1 | 4/2015 |
| KR | 10-2015-0117135 A | 10/2015 |
| KR | 10-2015-0134566 A | 12/2015 |
| KR | 10-2016-0024685 A | 3/2016 |
| KR | 10-2016-0043725 A | 4/2016 |
| KR | 10-2016-0092748 A | 8/2016 |
| KR | 10-1679413 B1 | 11/2016 |
| KR | 10-2017-0025074 A | 3/2017 |
| KR | 10-2017-0033543 A | 3/2017 |
| KR | 10-1743136 B1 | 6/2017 |
| KR | 10-2017-0101653 A | 9/2017 |
| KR | 10-1807353 B1 | 12/2017 |
| KR | 10-2018-0026910 A | 3/2018 |
| KR | 10-1839158 B1 | 3/2018 |
| KR | 10-2018-0087606 A | 8/2018 |
| KR | 10-2018-0106367 A | 10/2018 |
| KR | 10-2018-0116004 A | 10/2018 |
| KR | 10-2018-0116156 A | 10/2018 |
| KR | 10-2018-0129115 A | 12/2018 |
| KR | 10-2019-0030016 A | 3/2019 |
| KR | 10-2019-0040699 A | 4/2019 |
| KR | 10-2019-0078094 A | 7/2019 |
| KR | 10-2042999-1 | 11/2019 |
| KR | 10-2020-0007561 A | 1/2020 |
| KR | 10-2020-0020173 A | 2/2020 |
| KR | 10-2020-0035739 A | 4/2020 |
| KR | 10-2020-0037599 A | 4/2020 |
| KR | 10-2020-0039214 A | 4/2020 |
| KR | 10-2020-0041625 A | 4/2020 |
| KR | 10-2020-0086957 A | 7/2020 |
| KR | 10-2020-0094453 A | 8/2020 |
| KR | 10-2020-0102777 A | 9/2020 |
| KR | 10-2149886 B1 | 9/2020 |
| KR | 10-2021-0006203 A | 1/2021 |
| KR | 10-2021-0012636 A | 2/2021 |
| TW | I679311 B | 12/2019 |
| WO | WO 01/59856 A1 | 8/2001 |
| WO | WO 2006/035980 A1 | 4/2006 |
| WO | WO 2006/085437 A1 | 8/2006 |
| WO | WO 2010/146154 A2 | 12/2010 |
| WO | WO 2012/090599 A1 | 7/2012 |
| WO | WO 2013/024774 A1 | 2/2013 |
| WO | WO 2015/025388 A1 | 2/2015 |
| WO | WO 2016/088287 A1 | 6/2016 |
| WO | WO 2016/203708 A1 | 12/2016 |
| WO | WO 2017/223429 A1 | 12/2017 |
| WO | WO 2018/117457 A1 | 6/2018 |
| WO | WO 2018/134704 A1 | 7/2018 |
| WO | WO 2019/151662 A1 | 8/2019 |
| WO | WO 2020/060069 A1 | 3/2020 |
| WO | WO 2020/083278 A1 | 4/2020 |
| WO | WO 2020/110888 A1 | 6/2020 |
| WO | WO-2020/149350 A1 | 7/2020 |
| WO | WO 2020/159071 A1 | 8/2020 |
| WO | WO 2020/174954 A1 | 9/2020 |
| WO | WO-2021/020119 A1 | 2/2021 |
| WO | WO-2021/020237 A1 | 2/2021 |
| WO | WO 2022/061187 A1 | 3/2022 |

OTHER PUBLICATIONS

Third Party Observation dated Apr. 9, 2024 for European Application No. 22742833.1.
Automotive & Accessories Magazine, "The core topic of Tesla's "Battery Day": reducing battery manufacturing costs," Sep. 23, 2020, 6 pages.
Third Party Observation dated Feb. 26, 2024 for European Application No. 22152256.8.
Third Party Observation dated Feb. 26, 2024 for European Application No. 22152262.6.
Third Party Observation dated Apr. 17, 2024 for European Application No. 22742840.6.
Third Party Observation dated Apr. 18, 2024 for European Application No. 23214922.9.
Third Party Observation dated Apr. 19, 2024 for European Application No. 22742838.0.

(56) References Cited

OTHER PUBLICATIONS

Third Party Observation dated Apr. 25, 2024 for European Application No. 22742834.9.
Third Party Observation dated Apr. 4, 2024 for U.S. Appl. No. 17/592,576.
Third Party Observation dated Mar. 22, 2024 for U.S. Appl. No. 17/592,672.
European Communication pursuant to Rule 114(2) EPC for European Application No. 22756569.4, dated Jun. 6, 2024.
European Communication pursuant to Rule 114(2) EPC for European Application No. 22756569.4, dated May 27, 2024.
European Communication pursuant to Rule 114(2) EPC for European Application No. 22756574.4, dated May 3, 2024.
European Communication pursuant to Rule 114(2) EPC for European Application No. 22756576.9, dated Apr. 16, 2024.
European Communication pursuant to Rule 114(2) EPC for European Application No. 22856151.0, dated Apr. 30, 2024.
European Communication pursuant to Rule 114(2) EPC for European Application No. 22881171.7, dated May 3, 2024.
European Communication pursuant to Rule 114(2) EPC for European Application No. 22883724.1, dated May 8, 2024.
European Communication pursuant to Rule 114(2) EPC for European Application No. 22895785.8, dated Apr. 16, 2024.
Partial Supplementary European Search Report for European Application No. 22742840.6, dated Jul. 15, 2024.
Third Party Observation for European Application No. 22881172.5, dated Jul. 22, 2024.
European Search Report mailed in EP 22 15 2207 on Jul. 22, 2022 (9 pages).
European Search Report mailed in EP 22152223 on Jul. 29, 2022 (10 pages).
European Search Report mailed in EP 22152237 on Aug. 2, 2022 (11 pages).
European Search Report mailed in EP 22152245 on Jul. 28, 2022 (11 pages).
European Search Report mailed in EP 22152250 on Aug. 5, 2022 (12 pages).
ASM Aerospace Specification Metals Inc., "Aluminum 5052-H19 Foil", 2001, https://asm.matweb.com/search/SpecificMaterial.asp?bassnum=ma5052h 19, 2 pages.
Iowa State University, Center for Nondestructive Evaluation, NDE-Ed.org, Physics of Nondestructive Evaluation>Electricity, 2021, https://www.nde-ed.org/Physics/Electricity/voltage.xhtml, 14 pages.
Third Party Observation dated Feb. 13, 2024 for European Application No. 22742834.9.
U.S. Notice of Allowance for U.S. Appl. No. 17/579,380, dated Feb. 14, 2024.
U.S. Office Action for U.S. Appl. No. 17/665,896, dated Feb. 12, 2024.
Youtube, "Tesla Battery Day", Sep. 22, 2020, https://www.youtube.com/watch?v=I6T9xleZTds, 2 pages.
"Laser Welding vs. Arc (Tig) Welding of Medical Instruments," ACCUMET, Oct. 22, 2014, URL: <https://www.accumet.com/updates/consider_laser_welding_instead/>.
Ma et al., "Electro-Thermal Modeling of a Lithium-ion Battery System," SAE International Journal of Engines, vol. 3, No. 2, Oct. 25, 2010, p. 306 (abstract only).
U.S. Office Action for U.S. Appl. No. 17/579,380, dated Jul. 20, 2023.
U.S. Office Action for U.S. Appl. No. 17/592,597, dated Jun. 21, 2023.
U.S. Office Action for U.S. Appl. No. 18/086,410, dated Jul. 24, 2023.
U.S. Office Action for U.S. Appl. No. 18/086,485, dated Aug. 15, 2023.
U.S. Advisory Action for U.S. Appl. No. 18/086,485, dated Nov. 3, 2023.
U.S. Office Action for U.S. Appl. No. 18/132,166, dated Oct. 2, 2023.
U.S. Office Action for U.S. Appl. No. 17/592,594, dated Nov. 24, 2023.
U.S. Office Action for U.S. Appl. No. 18/132,140, dated Nov. 28, 2023.
Nigel, "Tesla 4680 Cell," Battery Design, Nov. 18, 2022, URL: <https://www.batterydesign.net/tesla-4680-cell/>.
U.S. Notice of Allowance for U.S. Appl. No. 18/131,751, dated Jan. 16, 2024.
European Communication pursuant to Rule 114(2) EPC for European Application No. 22742840.6, dated Feb. 5, 2024.
Notice of Opposition for European Application No. 22152223.8, dated Oct. 16, 2024.
U.S. Office Action for U.S. Appl. No. 17/592,576, dated Oct. 17, 2024.
U.S. Office Action for U.S. Appl. No. 17/592,608, dated Oct. 17, 2024.
Video relating to Tesla battery production, YouTube, published on Jan. 18, 2021, URL: <https://www.youtube.com/watch?v=zB8_HbrxUi8>.
Third Party Observation for U.S. Appl. No. 18/273,010, dated Oct. 22, 2024.
Third Party Observation for U.S. Appl. No. 18/277,848, dated Oct. 25, 2024.
U.S. Office Action for U.S. Appl. No. 18/132,085, dated Jun. 14, 2023.
"What is the "Tabless Battery" Tesla Unveiled?," Donga—A Science, URL: <https://www.dongascience.com/print.php?idx=40048>, Sep. 23, 2020, 6 pages total, with English translation.
Third Party Observation for European Application No. 23218081.0, dated Jan. 9, 2025.
European Communication of a Notice of Opposition for European Application No. 22152245.1, dated Dec. 10, 2024.
European Communication pursuant to Article 94(3) EPC for European Application No. 23 215 214.0, dated Nov. 21, 2024.
U.S. Office Action for U.S. Appl. No. 17/592,672, dated Dec. 23, 2024.
Extended European Search Report for European Application No. 22742833.1, dated Feb. 28, 2025.
Notice of Opposition for European Application No. 22152207.1, dated Mar. 11, 2025.
U.S. Appl. No. 63/081,244, filed Sep. 21, 2020.
U.S. Appl. No. 63/167,565, filed Mar. 29, 2021.
Third Party Observation for European Application No. 23215163.9, dated Jan. 17, 2025.
European Search Report for European Application No. 22756574.4, dated Jun. 5, 2025.
Extended European Search Report for European Application No. 22742838.0, dated Jun. 18, 2025.
Extended European Search Report for European Application No. 22756569.4, dated Jun. 5, 2025.
Extended European Search Report for European Application No. 22756575.1, dated Mar. 27, 2025.
U.S. Office Action for U.S. Appl. No. 17/592,576, dated Mar. 31, 2025.
U.S. Office Action for U.S. Appl. No. 18/132,140, dated May 9, 2025.

* cited by examiner

RIVETING STRUCTURE OF ELECTRODE TERMINAL, AND CYLINDRICAL BATTERY CELL, BATTERY PACK AND VEHICLE INCLUDING THE SAME

CROSS-REFERENCE TO RELATED APPLICATIONS

This application is a Continuation of U.S. application Ser. No. 17/592,576, filed on Feb. 4, 2022, which claims the benefit under 35 U.S.C. § 119(a) to Patent Application No. 10-2021-0022881, filed in the Republic of Korea on Feb. 19, 2021, Patent Application No. 10-2021-0022891, filed in the Republic of Korea on Feb. 19, 2021, Patent Application No. 10-2021-0022894, filed in the Republic of Korea on Feb. 19, 2021, Patent Application No. 10-2021-0022897, filed in the Republic of Korea on Feb. 19, 2021, Patent Application No. 10-2021-0024424, filed in the Republic of Korea on Feb. 23, 2021, Patent Application No. 10-2021-0030291, filed in the Republic of Korea on Mar. 8, 2021, Patent Application No. 10-2021-0030300, filed in the Republic of Korea on Mar. 8, 2021, Patent Application No. 10-2021-0046798, filed in the Republic of Korea on Apr. 9, 2021, Patent Application No. 10-2021-0058183, filed in the Republic of Korea on May 4, 2021, Patent Application No. 10-2021-0077046, filed in the Republic of Korea on Jun. 14, 2021, Patent Application No. 10-2021-0084326, filed in the Republic of Korea on Jun. 28, 2021, Patent Application No. 10-2021-0131205, filed in the Republic of Korea on Oct. 1, 2021, Patent Application No. 10-2021-0131207, filed in the Republic of Korea on Oct. 1, 2021, Patent Application No. 10-2021-0131208, filed in the Republic of Korea on Oct. 1, 2021, Patent Application No. 10-2021-0131215, filed in the Republic of Korea on Oct. 1, 2021, Patent Application No. 10-2021-0131225, filed in the Republic of Korea on Oct. 1, 2021, Patent Application No. 10-2021-0137001, filed in the Republic of Korea on Oct. 14, 2021, Patent Application No. 10-2021-0137856, filed in the Republic of Korea on Oct. 15, 2021, Patent Application No. 10-2021-0142196, filed in the Republic of Korea on Oct. 22, 2021, Patent Application No. 10-2021-0153472, filed in the Republic of Korea on Nov. 9, 2021, Patent Application No. 10-2021-0160823, filed in the Republic of Korea on Nov. 19, 2021, Patent Application No. 10-2021-0163809, filed in the Republic of Korea on Nov. 24, 2021, Patent Application No. 10-2021-0165866, filed in the Republic of Korea on Nov. 26, 2021, Patent Application No. 10-2021-0172446, filed in the Republic of Korea on Dec. 3, 2021, Patent Application No. 10-2021-0177091, filed in the Republic of Korea on Dec. 10, 2021, Patent Application No. 10-2021-0194572, filed in the Republic of Korea on Dec. 31, 2021, Patent Application No. 10-2021-0194593, filed in the Republic of Korea on Dec. 31, 2021, Patent Application No. 10-2021-0194610, filed in the Republic of Korea on Dec. 31, 2021, Patent Application No. 10-2021-0194611, filed in the Republic of Korea on Dec. 31, 2021, Patent Application No. 10-2021-0194612, filed in the Republic of Korea on Dec. 31, 2021, and Patent Application No. 10-2022-0001802, filed in the Republic of Korea on Jan. 5, 2022, all of these applications being hereby expressly and fully incorporated by reference in their entireties into the present application.

Also, Patent Application No. 10-2021-0007278, filed in the Republic of Korea on Jan. 19, 2021, is hereby expressly incorporated by reference in its entirety into the present application.

TECHNICAL FIELD

The present disclosure relates to a riveting structure of an electrode terminal, and a cylindrical battery cell, a battery pack and a vehicle including the same.

BACKGROUND ART

Secondary batteries that are easily applicable to various product groups and have electrical characteristics such as high energy density are universally applied not only to portable devices but also to electric vehicles (EVs), hybrid electric vehicles (HEVs) or the like driven by an electric drive source.

These secondary batteries are attracting attention as a new energy source to improve eco-friendliness and energy efficiency because they have the primary advantage that they can dramatically reduce the use of fossil fuels as well as the secondary advantage that no by-products are generated from the use of energy.

Secondary batteries currently widely used in the art include lithium ion batteries, lithium polymer batteries, nickel cadmium batteries, nickel hydrogen batteries, nickel zinc batteries, and the like. A unit secondary battery cell has an operating voltage of about 2.5V to 4.5V. Therefore, when a higher output voltage is required, a battery pack is configured by connecting a plurality of battery cells in series. In addition, a plurality of battery cells may be connected in parallel to form a battery pack according to the charge/discharge capacity required for the battery pack. Accordingly, the number of battery cells included in the battery pack and the form of electrical connection may be variously set according to the required output voltage and/or charge/discharge capacity.

Meanwhile, as a kind of secondary battery cell, there are known cylindrical, rectangular, and pouch-type battery cells. In the case of a cylindrical battery cell, a separator serving as an insulator is interposed between a positive electrode and a negative electrode, and they are wound to form an electrode assembly in the form of a jelly roll, which is inserted into a battery can together with an electrolyte to configure a battery. In addition, a strip-shaped electrode tab may be connected to an uncoated portion of each of the positive electrode and the negative electrode, and the electrode tab electrically connects the electrode assembly and an electrode terminal exposed to the outside. For reference, the positive electrode terminal is a cap plate of a sealing body that seals the opening of the battery can, and the negative electrode terminal is the battery can.

However, according to the conventional cylindrical battery cell having such a structure, since current is concentrated in the strip-shaped electrode tab coupled to the uncoated portion of the positive electrode and/or the uncoated portion of the negative electrode, the current collection efficiency is not good due to large resistance and large heat generation due to a small cross section area of the strip-shaped electrode tab.

For small cylindrical battery cells with a form factor of 18650 or 21700, resistance and heat are not a major issue. However, when the form factor is increased to apply the cylindrical battery cell to an electric vehicle, the cylindrical battery cell may ignite while a lot of heat is generated around the electrode tab during the rapid charging process.

In order to solve this problem, there is provided a cylindrical battery cell (so-called tab-less cylindrical battery cell) in which the uncoated portion of the positive electrode and the uncoated portion of the negative electrode are designed to be positioned at the top and bottom of the jelly-roll type electrode assembly, respectively, and the current collecting plate is welded to the uncoated portion to improve the current collecting efficiency.

FIGS. 1 to 3 are diagrams showing a process of manufacturing a tab-less cylindrical battery cell. FIG. 1 shows the structure of an electrode plate, FIG. 2 shows a process of winding the electrode plate, and FIG. 3 shows a process of welding a current collecting plate to a bent surface of an uncoated portion. FIG. 4 is a sectional view showing the tab-less cylindrical battery cell, taken along a longitudinal direction (Y).

Referring to FIGS. 1 to 4, a positive electrode plate 10 and a negative electrode plate 11 have a structure in which a sheet-shaped current collector 20 is coated with an active material 21, and include an uncoated portion 22 at one long side along the winding direction X.

An electrode assembly A is manufactured by sequentially stacking the positive electrode plate 10 and the negative electrode plate 11 together with two sheets of separators 12 as shown in FIG. 2 and then winding them in one direction X. At this time, the uncoated portions of the positive electrode plate 10 and the negative electrode plate 11 are arranged in opposite directions.

After the winding process, the uncoated portion 10a of the positive electrode plate 10 and the uncoated portion 11a of the negative electrode plate 11 are bent toward the core. After that, current collecting plates 30, 31 are welded and coupled to the uncoated portions 10a, 11a, respectively.

An electrode tab is not separately coupled to the positive electrode uncoated portion 10a and the negative electrode uncoated portion 11a, the current collecting plates 30, 31 are connected to external electrode terminals, and a current path is formed with a large cross-sectional area along the winding axis direction of electrode assembly A (see an arrow in FIG. 3), which has an advantage of lowering the resistance of the battery cell. This is because resistance is inversely proportional to the cross-sectional area of the path through which the current flows.

However, when the form factor of the cylindrical battery cell increases and the magnitude of the charging current during rapid charging increases, the heat problem also occurs again in the tab-less cylindrical battery cell.

Specifically, the conventional tab-less cylindrical battery cell 40 includes a battery can 41 and a sealing body 42 as shown in FIG. 4. The sealing body 42 includes a cap plate 42a, a sealing gasket 42b and a connection plate 42c. The sealing gasket 42b surrounds the edge of the cap plate 42a and is fixed by a crimping portion 43. In addition, the electrode assembly A is fixed in the battery can 41 by a beading portion 44 to prevent vertical movement.

Typically, the positive electrode terminal is the cap plate 42a of the sealing body 42, and the negative electrode terminal is the battery can 41. Accordingly, the current collecting plate 30 coupled to the uncoated portion 10a of the positive electrode plate 10 is electrically connected to the connection plate 42c attached to the cap plate 42a through a lead 45 in the form of a strip. In addition, the current collecting plate 31 coupled to the uncoated portion 11a of the negative electrode plate 11 is electrically connected to the bottom of the battery can 41. An insulator 46 covers the current collecting plate 30 to prevent the battery can 41 and the uncoated portion 10a of the positive electrode plate 10 having different polarities from contacting each other and causing a short circuit.

When the current collecting plate 30 is connected to the connection plate 42c, the lead 45 in the form of a strip is used. The lead 45 is separately attached to the current collecting plate 30 or is manufactured integrally with the current collecting plate 30. However, since the lead 45 is in the form of a thin strip, its cross-sectional area is small, and thus a lot of heat is generated when the rapid charging current flows. In addition, the excessive heat generated from the lead 45 is transferred to the electrode assembly A to shrink the separator 12, which may cause an inner short circuit that is a main cause of thermal runaway.

The lead 45 also occupies a significant installation space within the battery can 41. Therefore, the cylindrical battery cell 40 including the lead 45 has low space efficiency, so there is a limit in increasing the energy density.

Moreover, in order to connect the conventional tab-less cylindrical battery cells 40 in series and/or in parallel, it is necessary to connect a bus bar component to the cap plate 42a of the sealing body 42 and the bottom surface of the battery can 41, which deteriorates the space efficiency. A battery pack mounted on an electric vehicle includes hundreds of cylindrical battery cells 40. Therefore, the inefficiency of the electrical wiring causes considerable inconvenience in the assembly process of the electric vehicle and the maintenance of the battery pack.

SUMMARY OF THE DISCLOSURE

Technical Problem

The present disclosure is designed to solve the problems of the related art, and therefore the present disclosure is directed to lowering the inner resistance of a cylindrical battery cell and increasing the energy density by improving an electrode terminal structure of the cylindrical battery cell to increase the space efficiency in a battery can.

The present disclosure is also directed to improving the electrode terminal structure of a cylindrical battery cell to solve the internal heating problem caused during rapid charging by expanding the cross-sectional area of a current path.

The present disclosure is also directed to providing a cylindrical battery cell having an improved structure that allows electrical wiring for serial and/or parallel connection of the cylindrical battery cells to be performed at one side of the cylindrical battery cells.

The present disclosure is also directed to providing a battery pack manufactured using the cylindrical battery cell with an improved structure and a vehicle including the battery pack.

However, the technical objects to be solved by the present disclosure are not limited to the above, and other objects not mentioned herein will be clearly understood by those skilled in the art from the following disclosure.

Technical Solution

In one aspect of the present disclosure, there is provided a riveting structure of an electrode terminal for a battery, comprising: a battery housing having a bottom; an electrode terminal riveted through a hole formed in the bottom of the battery housing; and a gasket between the electrode terminal and the battery housing, wherein the electrode terminal includes: a body portion inserted into the hole; an outer flange portion extending along an outer surface of the bottom of the battery housing from a first side of the body portion exposed through the outer surface; an inner flange portion extending toward an inner surface of the bottom of the battery housing from a second side of the body portion exposed through the inner surface; and a flat portion on the second side of the body portion.

Preferably, the flat portion may be parallel with the inner surface of the bottom of the battery housing.

Preferably, an angle between the inner flange portion and the inner surface of the bottom of the battery housing may be in a range of 0° to 60°.

Preferably, a recess may be provided between the inner flange portion and the flat portion.

In an embodiment, the recess may have an asymmetric cross section.

In another embodiment, the asymmetric cross section of the recess may include a sidewall and an inclined surface of the inner flange portion connected to an end of the sidewall.

In still another embodiment, the sidewall may be perpendicular to the inner surface of the bottom of the battery housing.

In still another embodiment, the sidewall may be inclined toward the flat portion.

Preferably, the inner flange portion may have a gradually decreasing thickness in a direction extending away from the body portion.

Preferably, the gasket may include an outer gasket between the outer flange portion and the outer surface of the bottom of the battery housing, and an inner gasket between the inner flange portion and the inner surface of the bottom of the battery housing, and the inner gasket may have a varying thickness.

In an embodiment, a region of the inner gasket between an inner edge of the inner surface of the bottom of the battery housing and the inner flange portion may have a relatively smaller thickness than a remainder of the inner gasket.

In another embodiment, a region of the inner gasket between the battery housing and the body portion may have a gradually decreasing thickness in a direction extending away from the outer flange portion.

In still another embodiment, a region of the inner gasket between the inner surface of the bottom of the battery housing and a region near an end of the inner flange portion may have a smaller thickness than a remainder of the inner gasket.

In still another embodiment, the inner edge of the hole may include a facing surface that faces the inner flange portion.

In still another embodiment, the inner gasket may extend outwardly passed than the inner flange portion.

In still another embodiment, a height of the flat portion may be equal to or larger than a height of an end of the inner gasket based on the inner surface of the bottom of the battery housing.

In still another embodiment, a height of the flat portion may be equal to or larger than a height of the inner flange portion based on the inner surface of the bottom of the battery housing.

In still another embodiment, a height of the inner flange portion may be larger than a height of an end of the inner gasket based on the inner surface of the bottom of the battery housing.

Preferably, a height of the inner flange portion may be 0.5 mm to 3.0 mm based on the inner surface of the bottom of the battery housing.

Preferably, a height of the electrode terminal extending from a lower surface of the outer flange portion to a surface of the flat portion may be 4 mm to 7 mm.

Preferably, a height of the outer flange portion may be 0.8 mm or more based on the outer surface of the bottom of the battery housing.

Preferably, at least a portion of the outer gasket may be exposed to the outside of the outer flange portion, and a width of the exposed portion of the outer gasket measured in a direction parallel to the outer surface of the bottom of the battery housing may be 0.1 mm to 1 mm.

Preferably, a radius from a center of the body portion to an edge of the outer flange portion may be 10% to 70% of a radius of the bottom of the battery housing.

Preferably, a radius from a center of the body portion to an edge of the flat portion may be 4% to 30% of a radius of the bottom of the battery housing.

Preferably, a compression ratio of the inner gasket is 30% to 90%, and, and the compression ratio is a ratio of thickness change at a maximum compression point to a thickness before compression of the gasket.

More preferably, the inner gasket may include polybutylene terephthalate, polyethylene fluoride, or polypropylene, and the compression ratio of the inner gasket may be 50% to 90%.

In another aspect of the present disclosure, there is also provided a battery, comprising: an electrode assembly in which a first electrode and a second electrode wound with a separator therebetween, each of the first electrode and the second electrode has a first portion coated with an active material and a second portion, wherein the second portion of the first electrode and the second portion of the second electrode are extended from opposite ends of the electrode assembly and exposed to the outside of the separator; a battery housing accommodating the electrode assembly and electrically connected to the first electrode, the battery housing having a first end with a first opening and a second end opposite the first end; an electrode terminal riveted through a hole in the second end of the battery housing and electrically connected to the second electrode; the electrode terminal including: a body portion inserted into the hole; an outer flange portion extending along an outer surface of the second end of the battery housing from a first side of the body portion exposed through the outer surface; an inner flange portion extending toward an inner surface of the second end of the battery housing from a second side of the body portion exposed through the inner surface; and a flat portion on the second side of the body portion, a gasket between the electrode terminal and the battery housing; and a sealing body sealing the first opening of the first end of the battery housing so as to be insulated from the battery housing.

In an embodiment, the battery housing may include a beading portion formed in a region adjacent to the first end of the battery housing which is pressed-in into the battery housing, and the sealing body may include a cap having no polarity and a sealing gasket between an edge of the cap and the first end of the battery housing.

In another embodiment, the battery housing may further include a crimping portion extended and bent into the inside of the battery housing to surround and fix the edge of the cap together with the sealing gasket.

Preferably, the cap may include a vent notch that ruptures when a pressure inside the battery housing exceeds a threshold pressure.

Preferably, the vent notch may be ruptured when the pressure inside the battery housing is in a range of 15 $kgf/cm^2$ to 35 $kgf/cm^2$.

In still another embodiment, the cylindrical battery according to the present disclosure may further comprise a first current collecting unit coupled to the second portion of the first electrode, and at least a part of an edge of the first current collecting unit not in contact with the second portion of the first electrode may be between the beading portion and the sealing gasket and fixed by the crimping portion.

Preferably, at least a part of the edge of the first current collecting unit may be fixed to an inner circumference of the beading portion adjacent to the crimping portion by welding.

In still another embodiment, the cylindrical battery according to the present disclosure may further comprise a second current collecting unit coupled to the second portion of the second electrode plate, and at least a part of the second current collecting unit may be coupled to the flat portion of the electrode terminal.

Preferably, the second current collecting unit and the flat portion of the electrode terminal may be coupled through welding, and a tensile force of a weld between the second current collecting unit and the flat portion of the electrode terminal may be 2 kgf or above.

Preferably, a diameter of a welding pattern exposed on a surface of the second current collecting unit may be 2 mm or more.

Preferably, a diameter of the flat portion of the electrode terminal may be 3 mm to 14 mm.

Preferably, a ratio of an area of a welding pattern exposed on a surface of the second current collecting unit to an area of the flat portion of the electrode terminal may be 2.04% to 44.4%.

In still another embodiment, the cylindrical battery according to the present disclosure may further comprise an insulator between the second current collecting unit and an inner surface of the second end of the battery housing and between an inner surface of a sidewall of the battery housing and the electrode assembly.

Preferably, the insulator may have a welding hole formed to expose the flat portion of the electrode terminal toward the second current collecting unit and cover a surface of the second current collecting unit and an edge of one side of the electrode assembly.

Preferably, a height from the inner surface of the second end of the battery housing to the flat portion of the electrode terminal may be equal to or smaller than a thickness of the insulator.

Preferably, the gasket may include an outer gasket between the outer flange portion and the outer surface of the second end of the battery housing; and an inner gasket between the inner flange portion and the inner surface of the second end of the battery housing.

Preferably, an end of the inner gasket may be exposed to the outside of the inner flange portion.

In still another embodiment, the welding hole may expose the flat portion of the electrode terminal and the inner flange portion.

In still another embodiment, the welding hole may expose the flat portion of the electrode terminal, the inner flange portion and the inner gasket.

In still another embodiment, in the cylindrical battery cell according to the present disclosure, a first bus bar terminal may be electrically coupled to a surface of the electrode terminal, and a second bus bar terminal may be electrically coupled to the outer surface of the second end of the battery housing.

Preferably, the first bus bar terminal may overlap with the electrode terminal on a plane to form a first overlapping region, and the second bus bar terminal may overlap with the outer surface of the second end of the battery housing to form a second overlapping region, and a diameter of the electrode terminal and a width of the outer surface of the second end of the battery housing may satisfy the following relational expression, $$W_1 \leq E_1 \leq D - 2R_d - 2G - 2W_2$$

$$E_2 = 0.5*(D - 2R_d - 2G - E_1)$$

($E_1$: diameter of the outer flange portion 50b of the electrode terminal, $E_2$: width of an exposed surface parallel to a surface of the electrode terminal in the outer surface of the second end of the battery housing, D: diameter of the battery housing, $R_d$: width of a round region at an edge of the battery housing measured on a plane, G: exposure width of the outer gasket through an edge of the electrode terminal, $W_1$: maximum value among distances between any two points selected in an edge of the first overlapping region, $W_2$: maximum value among distances between two points where a plurality of linear lines passing through the center of the electrode terminal meet an edge of the second overlapping region).

In still another embodiment, a ratio of a diameter of the cylindrical battery to a height of the battery may be greater than 0.4.

In another aspect of the present disclosure, there is also provided a battery pack comprising a plurality of cylindrical batteries described above.

Preferably, the plurality of cylindrical batteries may be arranged in a predetermined number of columns, and the electrode terminal and the outer surface of the second end of the battery housing of each cylindrical battery of the plurality of batteries may be disposed to face upward.

Preferably, the battery pack according to the present disclosure may comprise a plurality of bus bars connecting the plurality of batteries in series and in parallel, the plurality of bus bars may be disposed above the plurality of cylindrical batteries, and each bus bar of the plurality of bus bars may include a body portion extending between electrode terminals of adjacent cylindrical batteries; a plurality of first bus bar terminals respectively extending in one side direction from the body and electrically coupled to the electrode terminal of the battery located in the one side direction; and a plurality of second bus bar terminals respectively extending in the other side direction from the body and electrically coupled to the outer surface of the second end of the battery housing of the cylindrical batteries located in the other side direction.

Preferably, an AC resistance of the battery measured between the electrode terminal and the outer surface of the second end of the battery housing may be 4 milliohms (mohm) or less.

In another aspect of the present disclosure, there is also provided a vehicle comprising the battery pack described above.

In still another embodiment, an electrode terminal for a battery according to the present disclosure may further comprise a body having a top surface, a lower surface and an outer surface, an outer flange extending from the outer surface of the body and capable of extending along an outer surface of a bottom of a battery housing, an inner flange extending from the outer surface of the body, the inner flange being above the outer flange and the top surface on the body capable of contacting a current collecting unit.

The top surface on the body may be above the inner flange.

The top surface on the body may be flat.

The electrode terminal may further comprise a recess between the body and the inner flange.

The recess may have a first surface formed by the outer surface of the body and a second surface formed by an upper surface of the inner flange.

The first surface and second surface may be asymmetrical.

An angle between the inner flange and the outer flange may be between 0° to 60°.

Advantageous Effects

According to an embodiment of the present disclosure, it is possible to lower the inner resistance of a cylindrical battery cell and increase the energy density by improving an electrode terminal structure of the cylindrical battery cell to increase the space efficiency in a battery can.

According to another embodiment of the present disclosure, it is possible to solve the internal heating problem caused during rapid charging by improving the electrode terminal structure of a cylindrical battery cell to expand the cross-sectional area of a current path.

According to still another embodiment of the present disclosure, electrical wiring for serial and/or parallel connection of the cylindrical battery cells may be performed at one side of the cylindrical battery cells.

According to still another embodiment of the present disclosure, it is possible to provide a battery pack manufactured using the cylindrical battery cell with an improved structure and a vehicle including the battery pack.

DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION OF THE EMBODIMENTS

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, in order to help understanding of the invention, in the accompanying drawings, some components may not be drawn to scale, but their dimensions may be exaggerated. Also, the same reference numbers may be assigned to the same components in different embodiments.

When it is explained that two objects are identical, this means that these objects are 'substantially identical'. Accordingly, the substantially identical objects may include deviations considered low in the art, for example, deviations within 5%. Also, when it is explained that certain parameters are uniform in a predetermined region, this may mean that the parameters are uniform in terms of an average.

A cylindrical battery cell according to an embodiment of the present disclosure may include an electrode terminal riveted to the bottom of a battery can.

Figure 5:
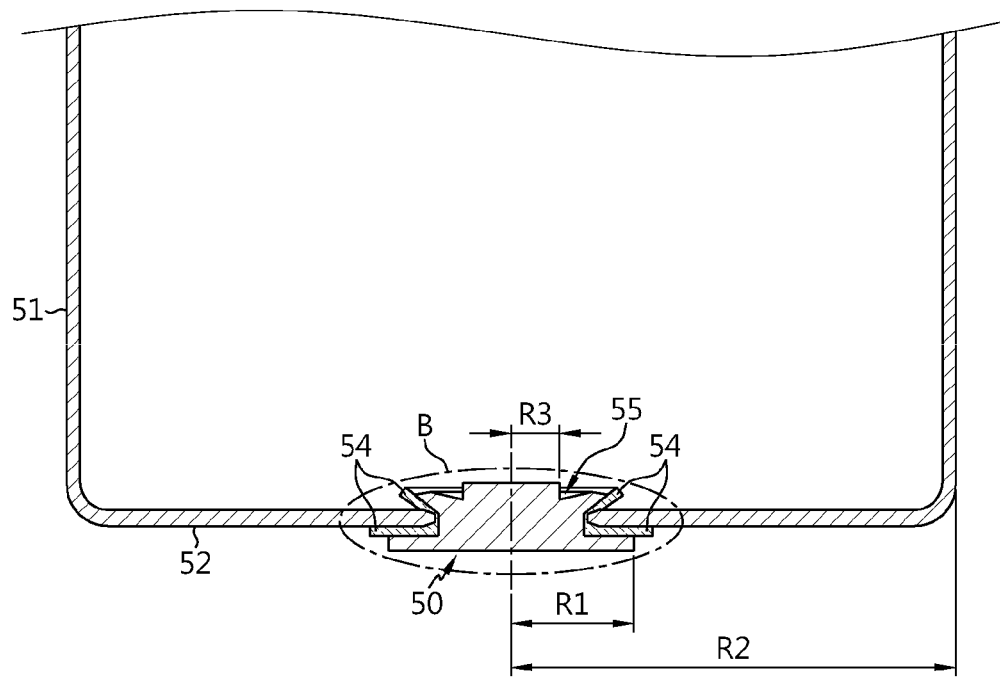
FIG. 5 is a sectional view showing a riveting structure of an electrode terminal according to an embodiment of the present disclosure.
Figure 6A:
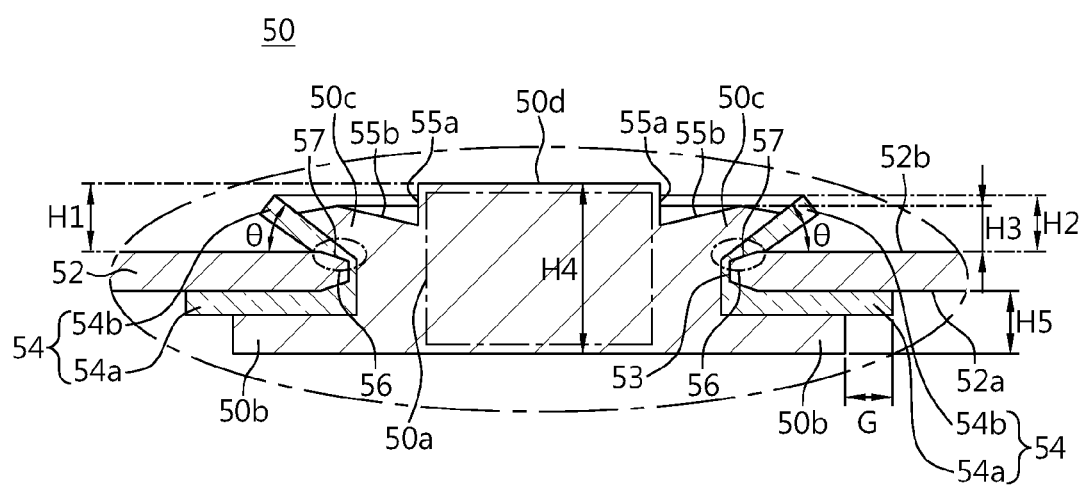
FIG. 6a is an enlarged sectional view showing a portion indicated by a dotted circle in FIG. 5.

FIG. 5 is a sectional view showing a riveting structure of an electrode terminal 50 according to an embodiment of the present disclosure, and FIG. 6a is an enlarged sectional view showing a portion indicated by a dotted circle in FIG. 5.

Referring to FIGS. 5 and 6a, the riveting structure of the electrode terminal 50 according to the embodiment may include a cylindrical battery can 51 having one open side, an electrode terminal 50 riveted through a perforation hole 53 formed in a bottom 52 of the battery can 51, and a rivet gasket 54 interposed between the electrode terminal 50 and the battery can 51. Herein, the battery can 51 is one example of the battery housing in the cylindrical battery.

The battery can 51 is made of a conductive metal material. In one example, the battery can 51 may be made of a steel, an aluminum, stainless steel or the like, but the present disclosure is not limited thereto. The inner and outer surfaces of the battery can 51 may be coated with a Ni plating layer.

The electrode terminal 50 is made of a conductive metal material. In one example, the electrode terminal 50 may be made of a steel, an aluminum, stainless steel or the like, but the present disclosure is not limited thereto. The electrode terminal 50 may be made of 10 series aluminum alloy, which is easy to rivet and has low resistance.

The rivet gasket 54 may be made of a polymer resin having insulation and elasticity. In one example, the rivet gasket 54 may be made of polypropylene, polybutylene terephthalate, polyethylene fluoride, or the like, but the present disclosure is not limited thereto.

Preferably, the electrode terminal 50 may include a body portion 50a inserted into the perforation hole 53, an outer flange portion 50b extending along an outer surface 52a from the circumference of a first side of the body portion 50a exposed through the outer surface 52a of the bottom 52 of the battery can 51, an inner flange portion 50c extending toward an inner surface 52b from the circumference of a second side of the body portion 50a exposed through the inner surface 52b of the bottom 52 of the battery can 51, and a flat portion 50d provided on the second side of the body portion 50a.

Preferably, the flat portion 50d and the inner surface 52b of the bottom 52 of the battery can 51 may be parallel to each other. Here, the term 'parallel' means substantially parallel when observed with the naked eye.

According to an embodiment, the angle (θ) between the inner flange portion 50c and the inner surface 52b of the bottom 52 of the battery can 51 may be 0° to 60°. The size of the angle is determined by the caulking strength when the electrode terminal 50 is installed in the perforation hole 53 of the battery can 51 by a caulking method. In one example, as the caulking strength increases, the angle (θ) may decrease to 0°. If the angle exceeds 60°, the sealing effect of the rivet gasket 54 may be deteriorated.

According to another embodiment, a recess 55 may be provided between the inner flange portion 50c and the flat portion 50d. The recess 55 may have a sectional structure of an asymmetric groove. In one example, the asymmetric groove may have an approximately V shape. The asymmetric groove may include a sidewall 55a of the flat portion 50d and an inclined surface 55b of the inner flange portion 50c connected to an end of the sidewall 55a. The sidewall 55a may be substantially perpendicular to the inner surface 52b of the bottom 52 of the battery can 51. The term 'vertical' means substantially vertical when observed with the naked eye. As will be explained later, the sidewall 55a may be inclined toward the flat portion 50d. The recess 55 is formed by the shape of a caulking jig when the electrode terminal 50 is installed in the perforation hole 53 of the battery can 51 in a caulking method.

Preferably, the thickness of the inner flange portion 50c may gradually decrease as being farther away from the body portion 50a of the electrode terminal 50.

According to another embodiment, the rivet gasket 54 may include an outer gasket 54a interposed between the outer flange portion 50b and the outer surface 52a of the bottom 52 of the battery can 51, and an inner gasket 54b interposed between the inner flange portion 50c and the inner surface 52b of the bottom 52 of the battery can 51. Preferably, the outer gasket 54a and the inner gasket 54b are divided based on the outer surface 52a of the bottom of the battery can 51.

The outer gasket 54a and the inner gasket 54b may have different thicknesses depending on their locations. Preferably, a region of the inner gasket 54b interposed between the inner flange portion 50c and an inner edge 56 of the perforation hole 53 connected to the inner surface 52b of the bottom 52 of the battery can 51 may have a relatively smaller thickness. Preferably, a minimum thickness point may be present in a gasket region interposed between the inner edge 56 of the perforation hole 53 and the inner flange portion 50c. In addition, the inner edge 56 of the perforation hole 53 may include a facing surface 57 that faces the inner flange portion 50c.

Meanwhile, the top and bottom of the inner wall of the perforation hole 53 perpendicular to the bottom 52 of the battery can 51 are chamfered (corner-cut) to form a tapered surface toward the electrode terminal 50. However, the top and/or bottom of the inner wall of the perforation hole 53 may be transformed into a smooth curved surface with curvature. In this case, the stress applied to the gasket 54 near the top and/or bottom of the inner wall of the perforation hole 53 may be more relaxed.

Preferably, the inner gasket 54b may extend longer than the inner flange portion 50c while forming an angle of 0° to 60° with the inner surface 52b of the bottom 52 of the battery can 51.

In another embodiment, the height (H1) of the flat portion 50d based on the inner surface 52b of the bottom 52 of the battery can 51 may be equal to or greater than the height (H2) of the end of the inner gasket 54b. In addition, the height (H1) of the flat portion 50d based on the inner surface 52b of the bottom 52 of the battery can 51 may be equal to or greater than the height (H3) of the end of the inner flange portion 50c. Here, the height H2 is the maximum height of the end of the inner gasket 54b measured based on the inner surface 52b. In addition, the height H3 is the maximum height of the end of the inner flange portion 50c measured based on the inner surface 52b.

If the height parameters H1, H2 and H3 satisfy the conditions, it is possible to prevent the inner flange portion 50c and the inner gasket 54b from interfering with other components.

Preferably, the height (H3) of the inner flange portion 50c may be 0.5 mm to 3.0 mm. If the height (H3) of the inner flange portion 50c is less than 0.5 mm, sufficient sealing properties are not ensured. In addition, if the height (H3) of the inner flange portion 50c exceeds 3 mm, the inner space of the battery can 51 that can be occupied by the electrode assembly is reduced.

Preferably, the height (H4) of the electrode terminal 50 may be 1.5 mm to 7 mm. The height (H4) of the electrode terminal 50 corresponds to a distance from the lower surface of the outer flange portion 50b to the flat portion 50d. If the height (H4) of the electrode terminal 50 is less than 1.5 mm, it is difficult to increase the height of the inner flange portion 50c to the extent that sealing properties can be secured due to the thickness of the bottom 52 of the battery can 51. For reference, the thickness of the battery can 51 bottom 52 is about 0.5 mm to 1 mm. In addition, if the height (H4) of the electrode terminal 50 exceeds 7 mm, the inner space of the battery can 51 that can be occupied by the electrode assembly decreases and the height of the cell increases, and thus the energy density per unit volume decreases as much. When H3 and H4 satisfy the above numerical ranges, it is possible to sufficiently secure the sealing properties of the electrode terminal 50 without reducing the space inside the battery can 51.

In another embodiment, the height (H5) of the outer flange portion 50b may be 0.8 mm or more based on the outer surface 52a of the bottom 54 of the battery can 51. If the height (H5) of the outer flange portion 50b is less than 0.8 mm, the outer flange portion 50b may be deformed when the electrode terminal 50 is riveted. The thickness of the outer gasket 54a is 0.3 mm or more in consideration of insulation and sealing properties. Considering the thickness of the outer gasket 54a, if the height of the outer flange portion 50b is less than 0.8 mm, the outer flange portion 50b becomes thin to a level that is difficult to secure sufficient mechanical rigidity. In particular, it is more serious when the electrode terminal 50 is made of aluminum. Meanwhile, the height of the outer flange portion 50b may be appropriately set in consideration of the space margin of the upper part of the cell. In an example, the height of the outer flange portion 50b may be set to 2 mm or less, or 3 mm or less, or 4 mm or less, but the present disclosure is not limited thereto.

In still another embodiment, at least a portion of the outer gasket 54a may be exposed to the outside of the outer flange portion 50b of the electrode terminal 50. The outer gasket 54a is in order to insulate the electrode terminal 50 and the outer surface 52a having the opposite polarity to the electrode terminal 50 from each other. For electrical insulation of the electrode terminal 50 and the outer surface 52a, the exposure width (G) of the outer gasket 54a may be 0.1 mm to 1 mm. If the exposure width (G) is smaller than 0.1 mm, the electrical insulation of the electrode terminal 50 and the outer surface 42a on a plane may be broken when high c-rate charge/discharge of 300A or more is performed. In addition, if the exposure width (G) exceeds 1 mm, the electrical insulation effect is not further increased, but rather the area of the outer surface 42a used as an area of the negative electrode is reduced, so the contact area of a component (e.g., a bus bar) used for electrical connection is reduced.

In still another embodiment, the diameter of the flat portion 50d of the electrode terminal 50 may be determined in consideration of welding strength between the current collecting plate and the flat portion 50d. The tensile force of the welding portion between the flat portion 50d and the current collecting plate may be at least 2 kgf or more, or 5 kgf or more, or 6 kgf or more, or 7 kgf or more, or 8 kgf or more, or 9 kgf or more, or 10 kgf or more. It is desirable to increase the tensile force of the welding portion as much as possible within an allowable range by selecting the welding method in a best way.

Figure 6B:
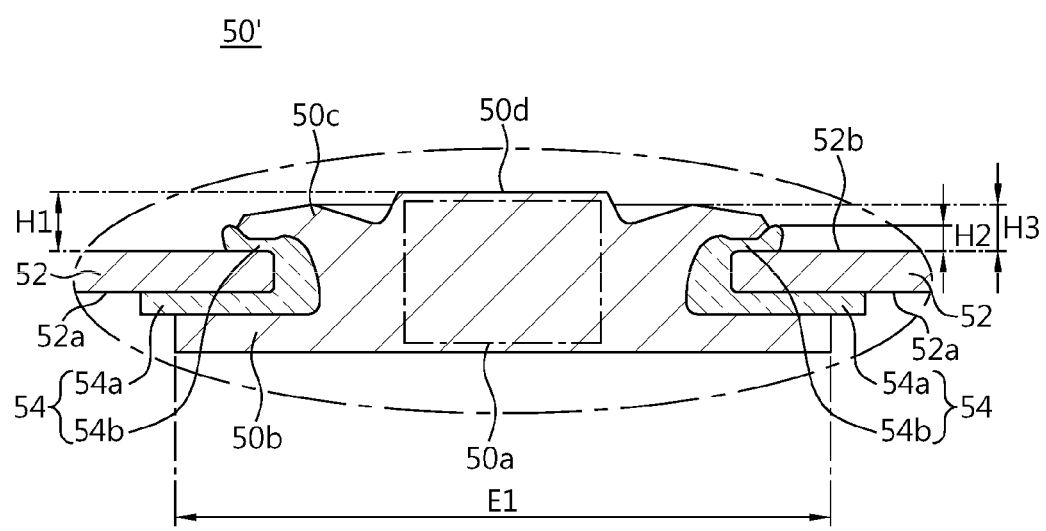
FIG. 6b is a partially enlarged sectional view showing a riveting structure of an electrode terminal according to another embodiment of the present disclosure.
Figure 6C:
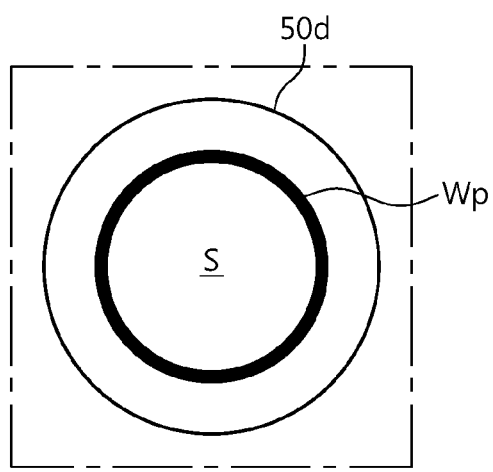
FIG. 6c is a plan view of a top of the flat portion of the terminal showing the welding pattern.

Referring to FIG. 6c, ¥in order to satisfy the tensile force condition of the welding portion, the diameter of the welding pattern Wp formed on the flat portion 50d may be at least 2 mm. When the area (S) of the welding pattern Wp appearing on the surface of the welding portion is converted into an area ($\pi r^2$) of a circle, the diameter of the welding pattern Wp may be defined as a converted diameter ($2*(S/\pi)^{0.5}$) of the corresponding circle. The welding pattern Wp may be continuous or discontinuous. When the welding pattern Wp is not a circle, the converted diameter may be determined from a maximum value among distances between a center of the flat portion 50d and an outer boundary of the welding pattern Wp.

The flat portion 50d of the electrode terminal 50 corresponds to a weldable region. The diameter of the weldable region may be 3 mm and 14 mm. If the diameter of the weldable region is less than 3 mm, it is difficult to secure a welding pattern with a diameter of 2 mm or more. In particular, when forming the welding pattern using laser welding, it is difficult to secure a welding pattern having a diameter of 2 mm or more due to laser beam interference. If the diameter of the weldable region exceeds 14 mm, the diameter of the outer flange portion 50b of the electrode terminal 50 becomes too large, and thus it is difficult to sufficiently secure the area of the outer surface 52a of the battery can bottom 52 to be used as the negative electrode region.

Considering the diameter condition of the welding pattern and the diameter condition of the weldable region, the ratio of the area of the welding pattern to the area of the weldable region required to secure a tensile force of the welding portion of at least 2 kgf or more is preferably 2.04% ($\pi 1^2/\pi 7^2$) to 44.4% ($\pi 1^2/\pi 1.5^2$).

In another embodiment, the radius (R1) from the center of the body portion 50a to the edge of the outer flange portion 50b may be 10 to 70% of the radius (R2) of the bottom 52 of the battery can 51.

If R1 is small, when wiring a component (a bus bar) used for electric connection of the electrode terminal 50, the welding space is insufficient. In addition, if R1 is large, the welding space decreases when welding a component (a bus bar) for electric connection to the outer surface 52a of the bottom 52 of the battery can 51 except for the electrode terminal 50.

If the ratio R1/R2 is adjusted between 10 and 70%, it is possible to properly secure the welding space for the electrode terminal 50 and the outer surface 52a of the bottom 52 of the battery can 51.

In addition, the radius (R3) from the center of the body portion 50a of the electrode terminal 50 to the edge of the flat portion 50d may be 4% to 30% of the radius (R2) of the bottom 52 of the battery can 51.

If R3 is small, the welding space becomes insufficient when welding a current collecting plate to the flat portion 50d of the electrode terminal 50, and the welding area of the electrode terminal 50 decreases, thereby increasing the contact resistance. In addition, R3 must be smaller than R1, and if R3 becomes larger, the thickness of the inner flange portion 50c becomes thinner, and the strength of the inner flange portion 50c compressing the rivet gasket 54 becomes weak, which may deteriorating the sealing ability of the rivet gasket 54.

If R3/R2 is adjusted between 4% to 30%, the welding process may be easily performed by sufficiently securing the welding area between the flat portion 50d of the electrode terminal 50 and the current collecting plate, and also it is possible to reduce the contact resistance of the welding region the and prevent the sealing ability of the rivet gasket 54 from deteriorating.

According to an embodiment of the present disclosure, the riveting structure of the electrode terminal 50 may be formed using a caulking jig that moves up and down. First, a preform (not shown) of the electrode terminal 50 is inserted into the perforation hole 53 formed in the bottom 52 of the battery can 51 by interposing the rivet gasket 54. The preform refers to an electrode terminal before being riveted.

Next, the caulking jig is inserted into the inner space of battery can 51. The caulking jig has a groove and a protrusion corresponding to the final shape of the electrode terminal 50 on the surface opposite the preform in order to form the electrode terminal 50 by riveting the preform.

Next, the caulking jig is moved downward to perform press-forming to the upper portion of the preform, so that the preform is transformed into a riveted electrode terminal 50.

While the preform is pressed by the caulking jig, the outer gasket 54*a* interposed between the outer flange portion 50*b* and the outer surface 52*a* of the bottom 52 of the battery can 51 is elastically compressed so that its thickness decreases. In addition, as the region of the inner gasket 54*b* interposed between the inner edge 56 of the perforation hole 53 and the preform is elastically compressed by the inner flange portion 50*c*, the thickness of the region is further reduced than other regions. In particular, the region where the thickness of the inner gasket 54*b* is intensively reduced is indicated by a dotted circle in FIG. 6*a*. Accordingly, the sealing and airtightness between the riveted electrode terminal 50 and the battery can 51 are significantly improved.

Preferably, the rivet gasket 54 is compressed sufficiently to secure a desired sealing strength without being physically damaged in the process of riveting the preform.

Preferably, the compression ratio of the rivet gasket 54 may be 30% to 90%. The minimum compression ratio (30%) corresponds to a compression ratio of a minimum level to ensure the sealing property of the electrode terminal 50. The maximum compression ratio (90%) corresponds to a compression ratio of a maximum level that can be achieved without physically damaging the rivet gasket 54.

In one example, when the rivet gasket 54 is made of polybutylene terephthalate, it is preferable that the rivet gasket 54 has a compression ratio of 50% or more at the point where the rivet gasket 54 is compressed to a minimum thickness. The compression ratio is a ratio of thickness change before and after compression with respect to the thickness before compression.

Preferably, the compression ratio is determined for the inner gasket 54*b*. That is, the compression ratio may be defined as the ratio of the thickness change at a maximum compression point compared to the thickness before compression of the inner gasket 54*b*. Hereinafter, this is also applied identically. The thickness of the inner gasket 54*b* before compression may be uniform, and a maximum compression point may exist near the inner edge 56.

In another example, when the rivet gasket 54 is made of polyfluoroethylene, it is preferable that the rivet gasket 54 has a compression ratio of 60% or more at the point where the rivet gasket 54 is compressed to a minimum thickness. Preferably, the compression ratio is determined for the inner gasket 54*b*.

In still another example, when the rivet gasket 54 is made of polypropylene, it is preferable that the rivet gasket 54 has a compression ratio of 60% or more at the point where the rivet gasket 54 is compressed to a minimum thickness. Preferably, the compression ratio is determined for the inner gasket 54*b*.

Preferably, press-forming may be performed in multiple stages to the upper portion of the preform by vertically moving the caulking jig at least two times. That is, the preform may be deformed several times by performing press-forming in multiple stages. At this time, the pressure applied to the caulking jig may be increased step by step. In this way, the stress applied to the preform is dispersed several times, thereby preventing the rivet gasket 54 from being damaged during the caulking process. In particular, when the region of the inner gasket 54*b* interposed between the inner edge 56 of the perforation hole 53 and the preform is intensively compressed by the inner flange portion 50*c*, the damage to the gasket is minimized by performing press-forming in multiple stages.

After the press-forming is completely performed to the preform using the caulking jig, if the caulking jig is separated from the battery can 51, the riveting structure of the electrode terminal 50 according to an embodiment of the present disclosure may be obtained as shown in FIG. 6*a*.

According to the above embodiment, the caulking jig performs press-forming to the upper portion of the preform by vertical moving inside the battery can 51. In some cases, a rotary jig used in the prior art may be used for performing press-forming to the preform.

However, the rotary jig rotates in a state of being inclined at a predetermined angle with respect to the central axis of the battery can 51. Therefore, the rotary jig with a large rotation radius may interfere with the inner wall of the battery can 51. In addition, if the battery can 51 has a large depth, the length of the rotary jig is also increased. In this case, as the rotation radius of the end of the rotary jig increases, press-forming may not be performed properly to the preform. Therefore, it is more effective to perform press-forming using a caulking jig rather than using a rotary jig.

Meanwhile, the electrode terminal 50 may have various structures depending on the design of the preform and/or the caulking jig and/or the rivet gasket 54 and the magnitude of the pressure applied to the preform during the caulking process.

FIG. 6*b* is a partially enlarged sectional view showing the structure of an electrode terminals 50' according to another embodiment of the present disclosure.

Referring to FIG. 6*b*, the electrode terminal 50' according to another embodiment has a structure in which the inner flange portion 50*c* is riveted to be substantially parallel to the inner surface 52*b* of the bottom 52 of the battery can 51. Therefore, the angle formed by the surface of the inner flange portion 50*c* opposite to the inner surface 52*b* of the bottom 52 of the battery can 51 with the inner surface 52*b* is substantially close to 0, and the height (H3) of the inner flange portion 53*c* is less than the height (H2) of the inner gasket 54*b*. In addition, the inner edge 57 of the perforation hole 53 has an arc shape with a predetermined curvature. In addition, the sidewall of the edge of the flat portion 50*d* has a structure inclined toward the flat portion 50*d*.

Preferably, the thickness of the inner gasket 54*b* may gradually decrease upward, decrease to the minimum thickness near the end of the inner flange portion 53*c*, and then slightly increase toward the uppermost end. The compression structure of this inner gasket 54*b* may further improve the sealing properties of the electrode terminal 50'. The compression ratio of the inner gasket 54*b* can be calculated at the minimum thickness point near the end of the inner flange portion 53*c*.

Preferably, the riveting structure of the electrode terminal 50, 50' according to the embodiments of the present disclosure described above may be applied to a cylindrical battery cell having a form factor greater than 21700.

Recently, as the cylindrical battery cell is applied to an electric vehicle, the form factor of the cylindrical battery cell is increasing compared to the conventional form factor of 18650, 21700, and the like. An increase in the form factor leads to an increase in energy density, an increase in safety against thermal runaway, and an improvement in cooling efficiency.

In addition, as will be explained later, electrical wiring may be performed at one side of the cylindrical battery cell to which the riveting structure of the electrode terminal 50, 50' is applied. In addition, the electrode terminal 50, 50' with a riveting structure has a large sectional area and low resistance, so it is very suitable for rapid charging.

Preferably, the cylindrical battery cell to which the structure of the electrode terminal 50, 50' of the present disclosure is applied may have a form factor ratio (defined as a value obtained by dividing the diameter of the cylindrical battery cell by height, namely a ratio of diameter (Φ) to height (H)) is greater than about 0.4.

Here, the form factor means a value indicating the diameter and height of a cylindrical battery cell. The cylindrical battery cell according to an embodiment of the present disclosure may be, for example, a 46110 cell, a 48750 cell, a 48110 cell, a 48800 cell, or a 46800 cell. In the numerical value representing the form factor, first two numbers indicate the diameter of the cell, next two numbers indicate the height of the cell, and the last number "0" indicates that the cross-section of the cell is circular. If the height of the cell exceeds 100 mm, the last number 0 can be omitted because a 3-digit number is needed to indicate the height of the cell.

A battery cell according to an embodiment of the present disclosure may be a cylindrical battery cell having an approximately cylindrical shape, whose diameter is approximately 46 mm, height is approximately 110 mm, and form factor ratio is 0.418.

A battery cell according to another embodiment may be a cylindrical battery cell having a substantially cylindrical shape, whose diameter is about 48 mm, height is about 75 mm, and form factor ratio is 0.640.

A battery cell according to still another embodiment may be a cylindrical battery cell having an approximately cylindrical shape, whose diameter is approximately 48 mm, height is approximately 110 mm, and form factor ratio is 0.418.

A battery cell according to still another embodiment may be a cylindrical battery cell having an approximately cylindrical shape, whose diameter is approximately 48 mm, height is approximately 80 mm, and form factor ratio is 0.600.

A battery cell according to still another embodiment may be a cylindrical battery cell having an approximately cylindrical shape, whose diameter is approximately 46 mm, height is approximately 80 mm, and form factor ratio is 0.575.

Conventionally, battery cells having a form factor ratio of about 0.4 or less have been used. That is, conventionally, for example, 18650 cell, 21700 cell, etc. were used. The 18650 cell has a diameter of approximately 18 mm, height of approximately 65 mm, and a form factor ratio of 0.277. The 21700 cell has a diameter of approximately 21 mm, a height of approximately 70 mm, and a form factor ratio of 0.300.

Figure 7A:
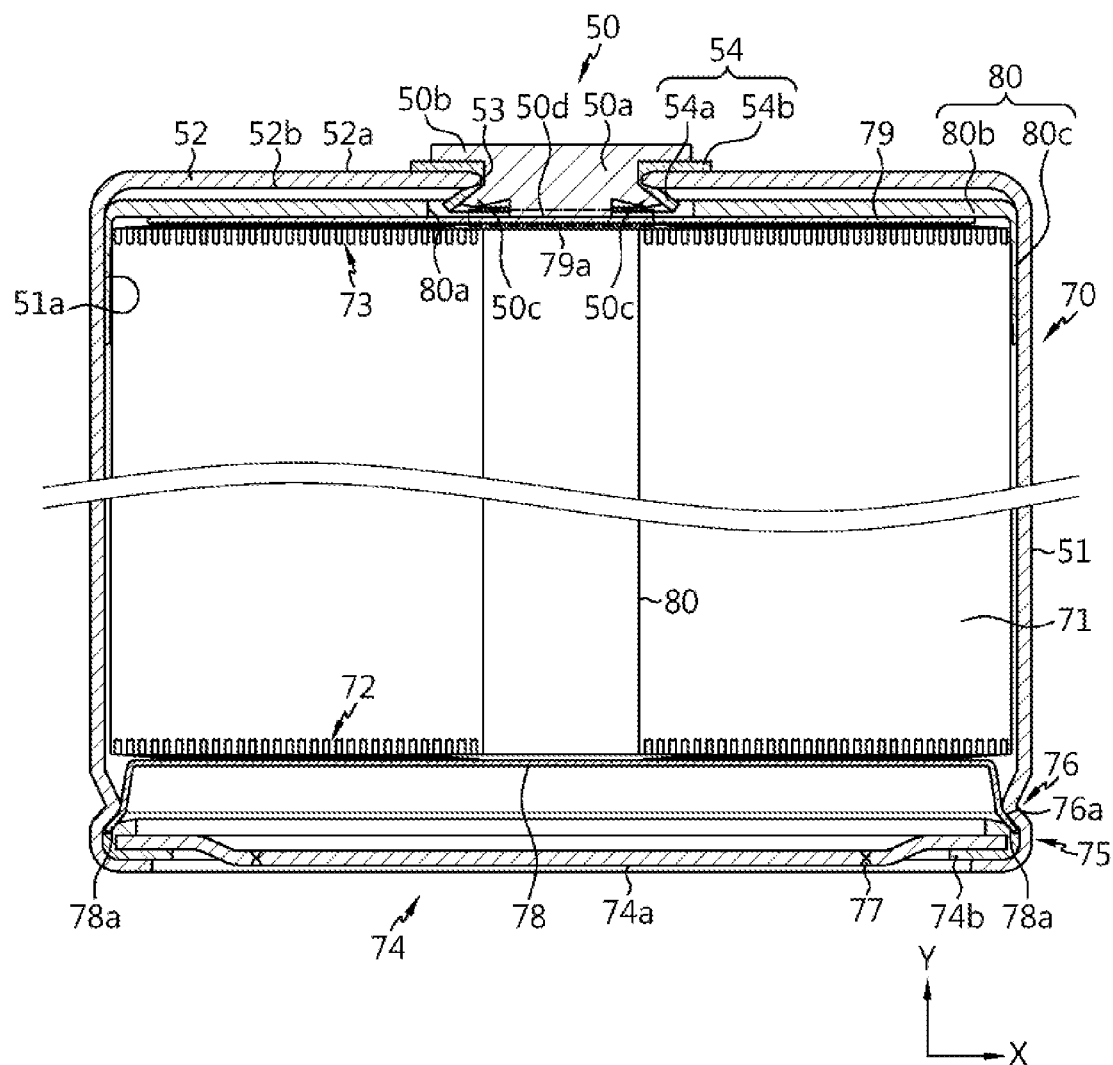
FIG. 7a is a sectional view showing a cylindrical battery cell according to an embodiment of the present disclosure, taken along a longitudinal direction (Y).

FIG. 7a is a sectional view showing a cylindrical battery cell 70 according to an embodiment of the present disclosure, taken along a longitudinal direction (Y).

Referring to FIG. 7a, the cylindrical battery cell 70 according to the embodiment includes a jelly-roll type electrode assembly 71 in which a first electrode plate and a second electrode plate having a sheet shape are wound with a separator interposed therebetween so that an uncoated portion 72 of the first electrode plate is exposed at a lower portion and an uncoated portion 73 of the second electrode plate is exposed at an upper portion.

In an embodiment, the first electrode plate may be a negative electrode plate and the second electrode plate may be a positive electrode plate, or vice versa.

Figure 2:
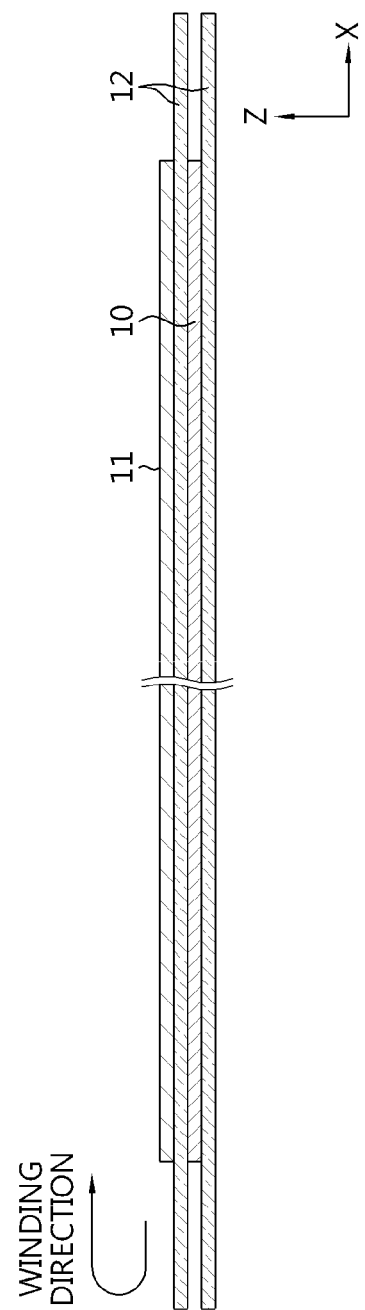
FIG. 2 is a diagram showing a process of winding an electrode assembly included in the conventional tab-less cylindrical battery cell.
Figure 3:
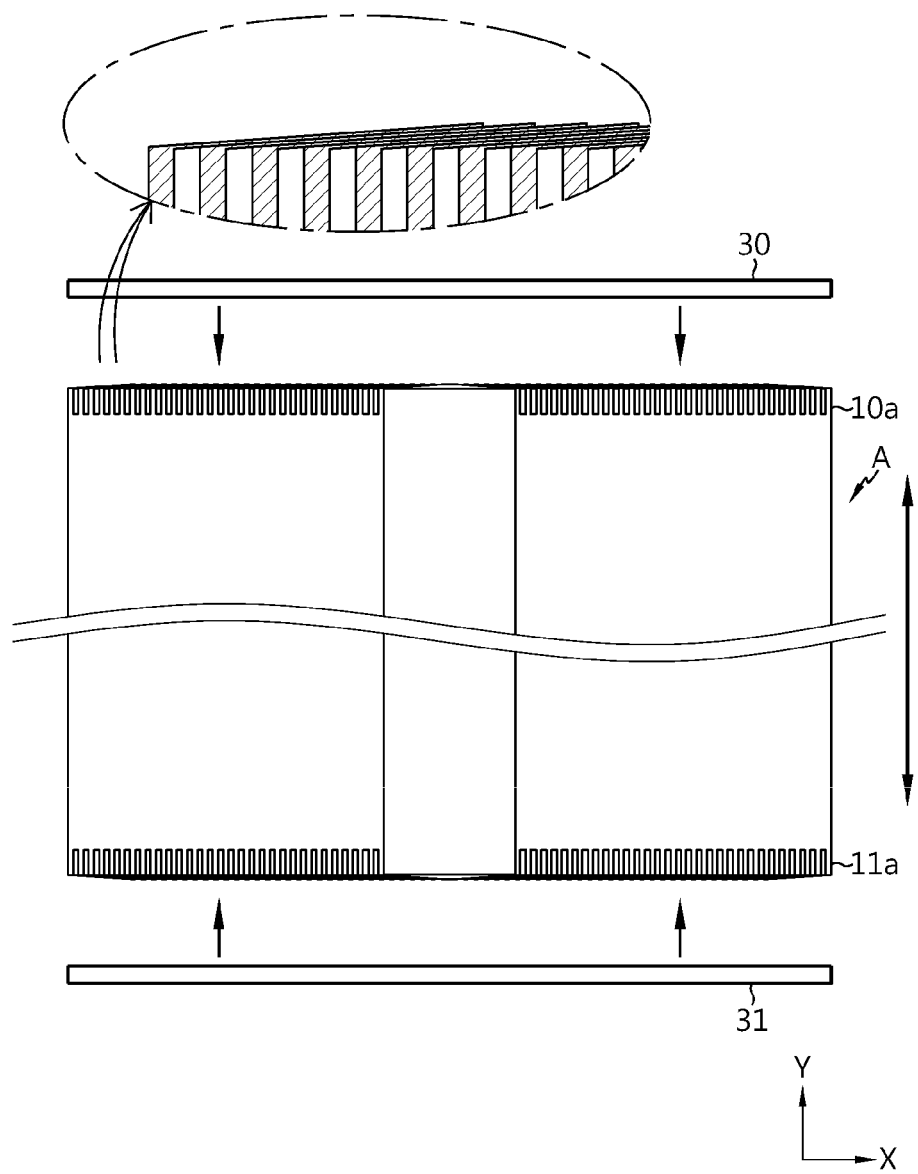
FIG. 3 is a diagram showing a process of welding a current collecting plate to a bent surface of an uncoated portion in the electrode assembly of FIG. 2.
Figure 4:
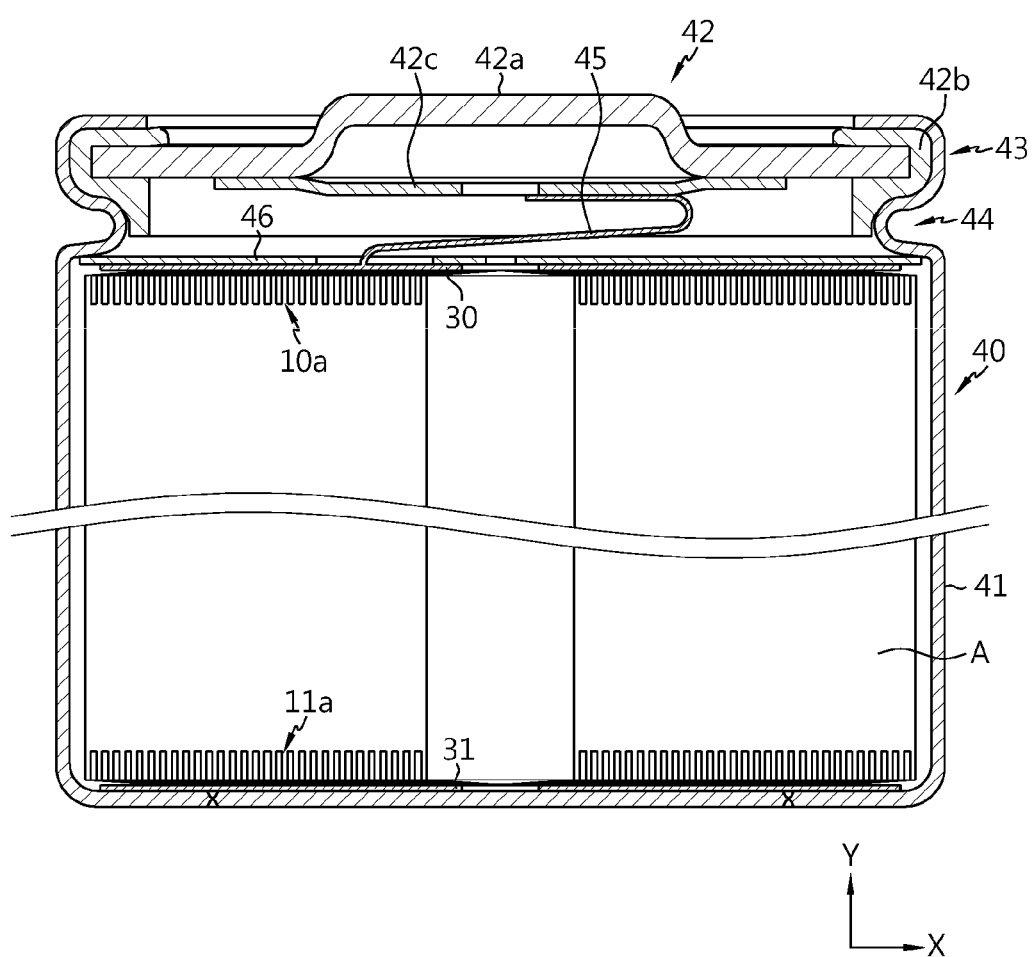
FIG. 4 is a sectional view showing the conventional tab-less cylindrical battery cell, taken along a longitudinal direction (Y).

The method of winding the electrode assembly 71 is substantially the same as the method of winding the electrode assembly used in manufacturing the conventional tab-less cylindrical battery cell described with reference to FIG. 2.

In depicting the electrode assembly 71, only the uncoated portions 72, 73 extending to be exposed to the outside of the separator are illustrated in detail, and the winding structure of the first electrode plate, the second electrode plate and the separator is not illustrated in detail.

The cylindrical battery cell 70 also includes a cylindrical battery can 51 that accommodates the electrode assembly 71 and is electrically connected to the uncoated portion 72 of the first electrode plate.

Preferably, one side (lower portion) of the battery can 51 is open. In addition, the bottom 52 of the battery can 51 has a structure in which the electrode terminal 50 is riveted to the perforation hole 53 through a caulking process.

Specifically, the electrode terminal 50 may include a body portion 50a inserted into the perforation hole 53, an outer flange portion 50b extending along the outer surface 52a from the circumference of one side of the body portion 50a exposed through the outer surface 52a of the bottom 52 of the battery can 51, an inner flange portion 50c extending toward the inner surface 52b from the circumference of the other side of the body portion 50a exposed through the inner surface 52b of the bottom 52 of the battery can 51, and a flat portion 50d provided on the second side of the body portion 50a.

The electrode terminal 50 may be replaced with the electrode terminal 50' shown in FIG. 6b.

The cylindrical battery cell 70 may also include a rivet gasket 54 interposed between the electrode terminal 50 and the battery can 51.

The cylindrical battery cell 70 may also include a sealing body 74 that seals the open end of the battery can 51 to be insulated from the battery can 51. Preferably, the sealing body 74 may include a cap plate 74a having no polarity and a sealing gasket 74b interposed between an edge of the cap plate 74a and the open end of the battery can 51.

The cap plate 74a may be made of a conductive metal material such as aluminum, steel, nickel or the like. In addition, the sealing gasket 74b may be made of polypropylene, polybutylene terephthalate, polyethylene fluoride, or the like having insulation and elasticity. However, the present disclosure is not limited by the materials of the cap plate 74a and the sealing gasket 74b.

The cap plate 74a may include a vent notch 77 that ruptures when the pressure inside the battery can 51 exceeds a threshold. The vent notch 77 may be formed at both sides of the cap plate 74a. The vent notch 77 may form a continuous or discontinuous circular pattern, a straight pattern or any other pattern on the surface of the cap plate 74a. The depth and width of the vent notch 77 may be set such that the vent notch 77 is ruptured when the pressure inside the battery can 51 is in the range of 15 $kgf/cm^2$ to 35 $kgf/cm^2$.

The battery can 51 may include a crimping portion 75 that is extended and bent into the inside of the battery can 51 to surround and fix the edge of the cap plate 74a together with the sealing gasket 74b in order to fix the sealing body 74 to the battery can 51.

Preferably, the lower surface of the cap plate 74a may be located above the lower end of the crimping portion 75.

Then, a vent space is formed below the cap plate 74a, so that when the vent notch 77 is ruptured, the gas can be smoothly discharged.

The battery can 51 may also include a beading portion 76 pressed-in into the battery can 51 in a region adjacent the open end thereof. The beading portion 76 supports the edge of the sealing body 74, particularly the outer circumferential surface of the sealing gasket 74b, when the sealing body 74 is fixed by the crimping portion 75.

The cylindrical battery cell 70 may further include a first current collecting plate 78 welded to the uncoated portion 72 of the first electrode plate. The first current collecting plate 78 is made of a conductive metal material such as aluminum, steel, nickel or the like. Preferably, at least a portion 78a of the edge of the first current collecting plate 78 not in contact with the uncoated portion 72 of the first electrode plate may be interposed between the beading portion 76 and the sealing gasket 74b and fixed by the crimping portion 75. Optionally, at least a portion 78a of the edge of the first current collecting plate 78 may be fixed to the inner circumference 76a of the beading portion 76 adjacent to the crimping portion 75 by a laser welding, a spot welding, an ultrasonic welding or the like.

The cylindrical battery cell 70 may also include a second current collecting plate 79 that is welded to the uncoated portion 73 of the second electrode plate. Preferably, at least a portion of the second current collecting plate 79, for example a central portion 79a thereof, may be welded to the flat portion 50d of the electrode terminal 50.

Preferably, when the second current collecting plate 79 is welded, a welding tool may be inserted through the cavity 80 in the core of the electrode assembly 71 to reach a welding point of the second current collecting plate 79. In addition, when the second current collecting plate 79 is welded to the flat portion 50d of the electrode terminal 50, since the electrode terminal 50 supports the welding region of the second current collecting plate 79, it is possible to improve the welding quality by applying a strong pressure to the welding region. In addition, since the flat portion 50d of the electrode terminal 50 has a large area, a wide welding region may also be secured. Accordingly, the contact resistance of the welding region is lowered, thereby lowering the inner resistance of the cylindrical battery cell 70. The face-to-face welding structure of the riveted electrode terminal 50 and the second current collecting plate 79 is very useful for rapid charging using high C-rate current. This is because the current density per unit area may be lowered in the cross section in a direction in which the current flows and thus the amount of heat generated in the current path may be lowered than that of the prior art.

When welding the flat portion 50d of the electrode terminal 50 and the second current collecting plate 79, any one of laser welding, ultrasonic welding, spot welding, and resistance welding may be used.

In one example, when the flat portion 50d and the second current collecting plate 79 are laser-welded in a continuous or discontinuous line in the form of an arc pattern, the diameter of the arc welding pattern is 2 mm or more, preferably 4 mm or more. When the diameter of the arc welding pattern satisfies the corresponding conditions, it is possible to increase the tensile force of the welding portion to 2 kgf or above, thereby securing sufficient welding strength.

In another example, when the flat portion 50d and the second current collecting plate 79 are ultrasonic-welded in a circular pattern, the diameter of the circular welding pattern is preferably 2 mm or more. When the diameter of the circular welding pattern satisfies the corresponding conditions, it is possible to increase the tensile force of the welding portion to 2 kgf or above, thereby securing sufficient welding strength.

The diameter of the flat portion 50d corresponding to the weldable region may be adjusted in the range of 3 mm to 14 mm. If the radius of the flat portion 50d is less than 3 mm, it is difficult to form a welding pattern with a diameter of 2 mm or more using a laser welding tool, an ultrasonic welding tool, or the like. In addition, if the radius of the flat portion 50d exceeds 14 mm, the size of the electrode terminal 50 becomes excessively large, and the area occupied by the outer surface 52a of the bottom 52 of the battery can 51 is reduced, so that it is difficult to connect an electrical connection component (a bus bar) through the outer surface 52a.

Preferably, since the diameter of the welding pattern for securing the welding portion tensile force to 2 kgf or more is 2 mm or more and the diameter of the weldable region is 3 mm to 14 mm, the area ratio of the welding pattern to the area of the weldable region may be $2.04(100*\pi1^2/\pi7^2)\%$ to $44.4(100*\pi1^2/\pi1.5^2)\%$.

The cylindrical battery cell 70 may further include an insulator 80. The insulator 80 may be interposed between the second current collecting plate 79 and the inner surface 52a of the bottom 52 of the battery can 51, and between the inner circumference 51a of the sidewall of the battery can 51 and the electrode assembly 71.

Preferably, the insulator 80 may have a welding hole 80a that exposes the flat portion 50d of the electrode terminal 50 toward the second current collecting plate 79. In addition, the welding hole 80a may expose the inner flange portion 50c and the inner gasket 54b together with the flat portion 50d of the electrode terminal.

Preferably, the insulator 80 may cover the surface of the second current collecting plate 79 and one (upper) edge of the electrode assembly 71. By doing so, it is possible to prevent the second current collecting plate 79 having a polarity different from that of the battery can 51 from contacting the uncoated portion 73 of the second electrode plate.

Preferably, the insulator 80 is made of an insulating resin, and may include an upper plate 80b and a side sleeve 80c. In one example, the upper plate 80b and the side sleeve 80c may be integrally formed by injection molding. Alternatively, the side sleeve 80c may be replaced with an insulation tape or the like. The insulation tape may cover the outer edge of the second current collecting plate 79 together with the uncoated portion 73 of the second electrode plate exposed through the outer circumference of the electrode assembly 71.

Figure 7B:
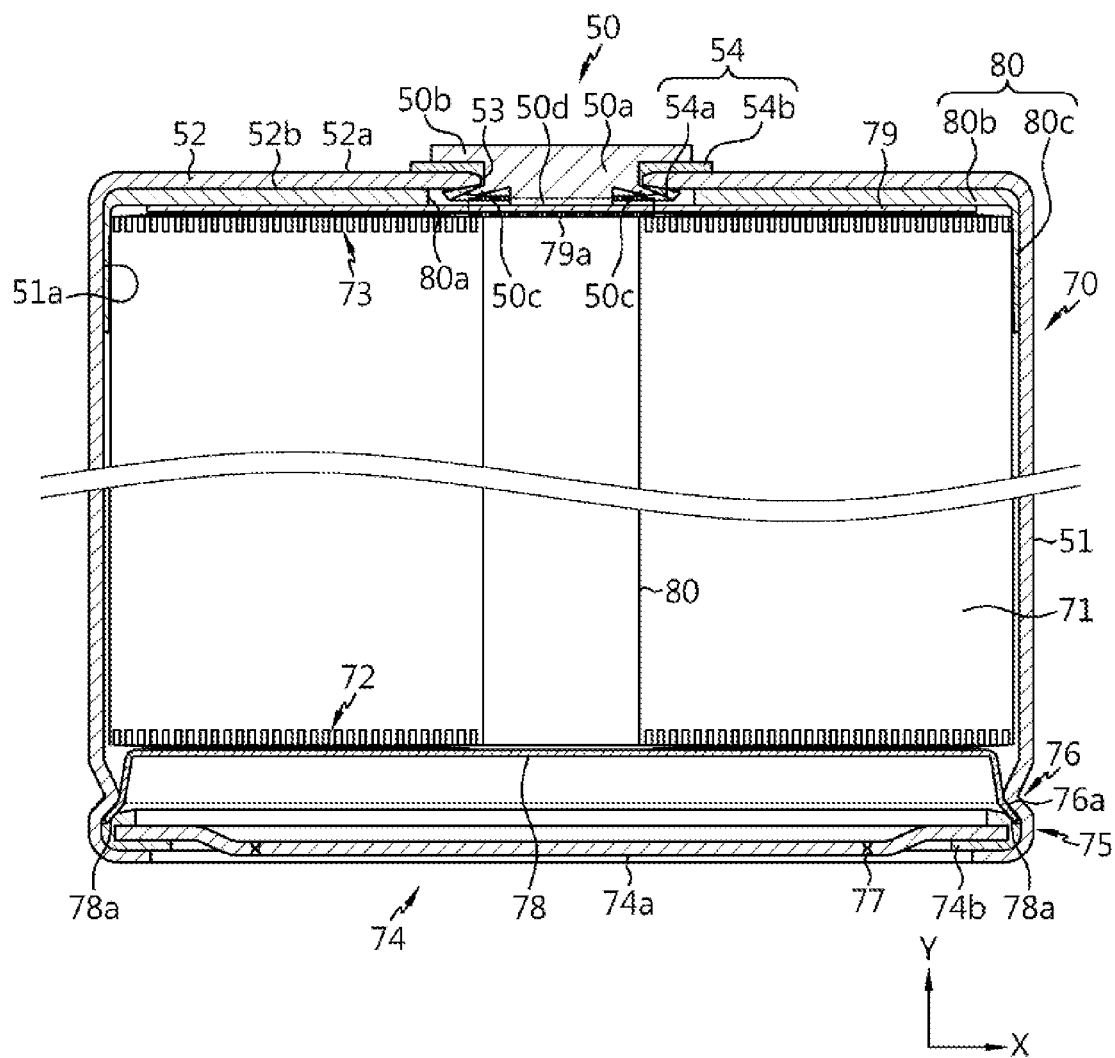
FIG. 7b is a sectional view showing a cylindrical battery cell according to another embodiment of the present disclosure, taken along a longitudinal direction (Y).

Preferably, the inner surface 52b of the insulator 80 and the bottom 52 of the battery can 51 may be in close contact with each other as shown in FIG. 7b. Here, 'close contact' means that there is no space (gap) that is visually confirmed. In order to eliminate the space (gap), the distance from the inner surface 52b of the bottom 52 of the battery can 51 to the flat portion 50d of the electrode terminal 50 may be equal to or slightly smaller than the thickness of the insulator 80.

Preferably, the uncoated portions 72, 73 of the first electrode plate and/or the second electrode plate may be bent in a radial direction, for example from the outer circumference of the electrode assembly 71 to the core, to form bent surfaces at the upper and lower portions of the electrode assembly 71. In addition, the first current collecting plate 78 may be welded to the bent surface formed by bending the uncoated portion 72 of the first electrode plate, and the second current collecting plate 79 may be welded to the bent surface formed by bending the uncoated portion 73 of the second electrode plate.

Figure 1:
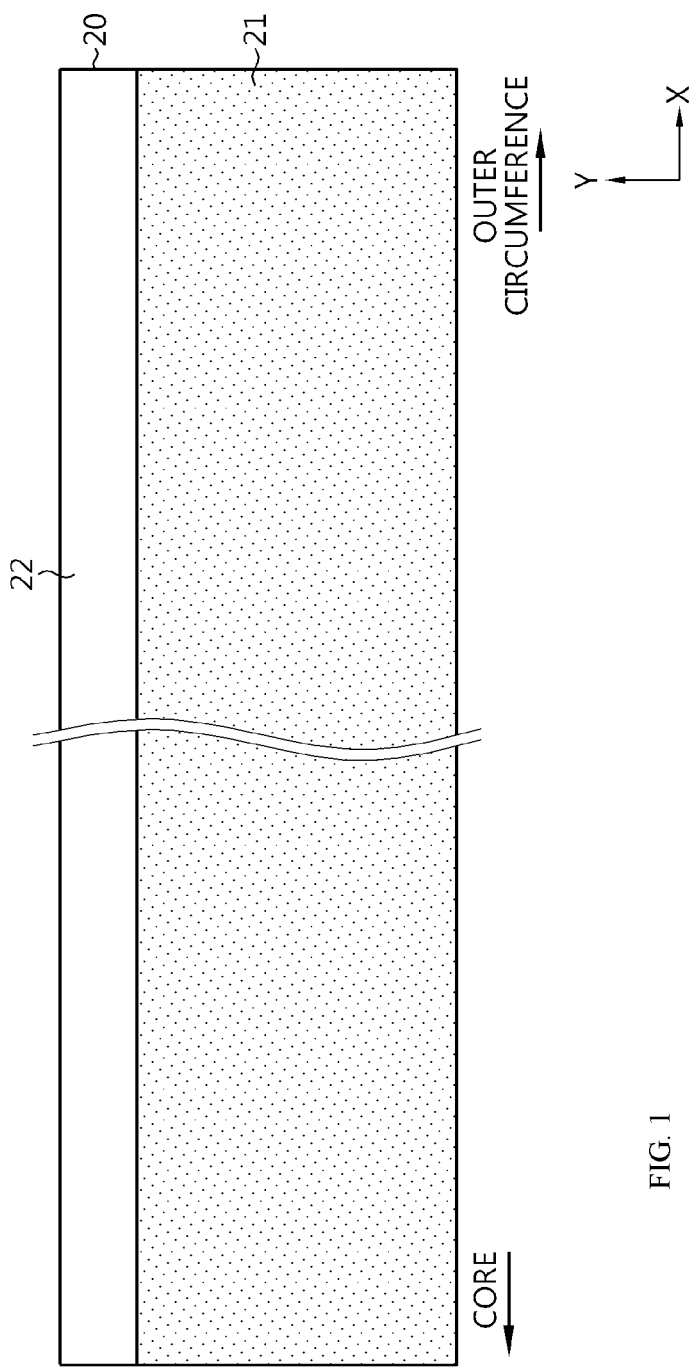
FIG. 1 is a plan view showing a structure of an electrode plate used for a conventional tab-less cylindrical battery cell.

In order to relieve the stress generated when the uncoated portions 72, 73 are bent, the first electrode plate and/or the second electrode plate may have an improved structure different from that of the conventional electrode plate (see FIG. 1).

Figure 8:
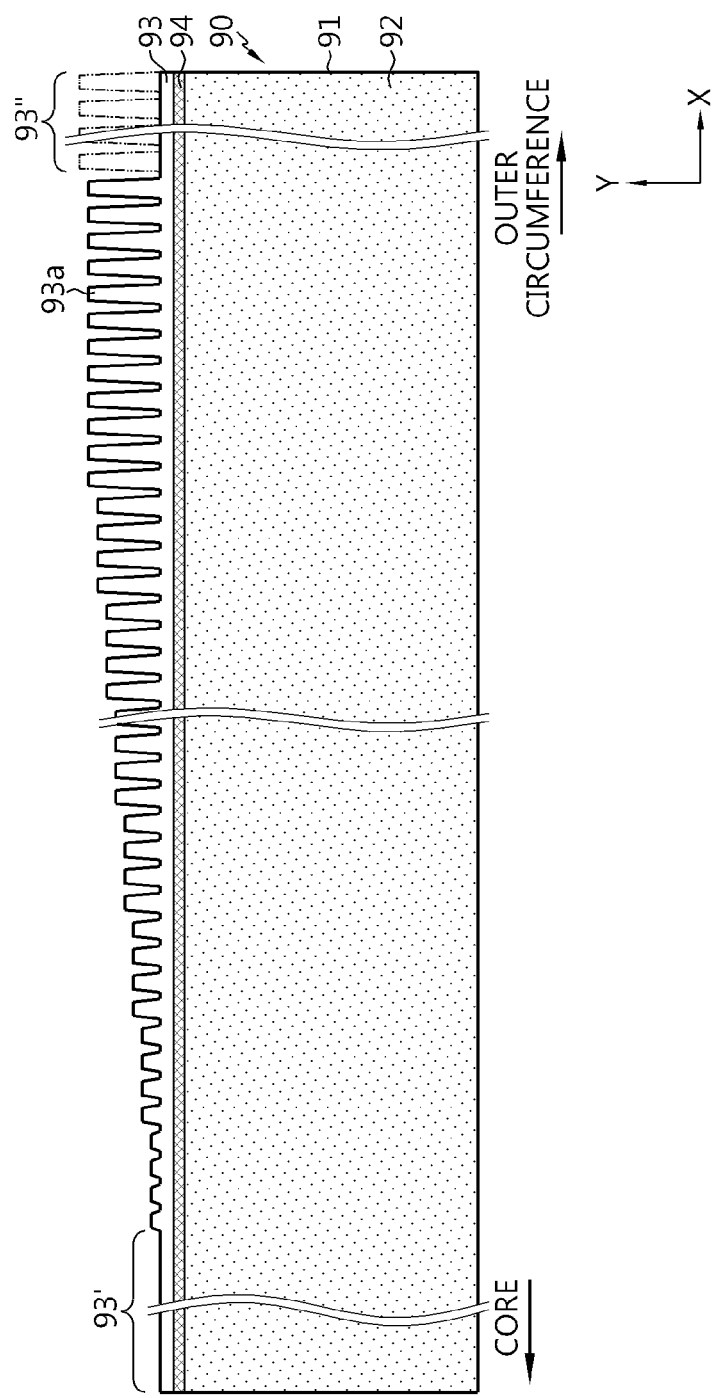
FIG. 8 is a plan view exemplarily showing an electrode plate structure according to a preferred embodiment of the present disclosure.

FIG. 8 is a plan view exemplarily showing a structure of an electrode plate 90 according to a preferred embodiment of the present disclosure.

Referring to FIG. 8, the electrode plate 90 has a sheet-shaped current collector 91 made of a conductive material foil, an active material layer 92 formed on at least one surface of the current collector 91, and an uncoated portion 93 formed at a long side end of the current collector 91 and not coated with an active material.

Preferably, the uncoated portion 93 may include a plurality of notched segments 93*a*. The plurality of segments 93*a* constitute a plurality of groups, and the segments 93*a* included in each group may have the same height (length in the Y direction) and/or the same width (length in the X direction) and/or the same separation pitch. The number of segments 93*a* belonging to each group may be increased or decreased than shown. The segment 93*a* has a shape of a geometric figure in which at least one linear line and/or at least one curve are combined. Preferably, the segment 93*a* may have a trapezoidal shape, which may be changed into a rectangular, parallelogram, semicircular, semi-elliptical shape, or the like as desired.

Preferably, the height of the segment 93*a* may be increased stepwise along one direction parallel to the winding direction of the electrode assembly, for example from the core to the outer circumference. In addition, a core-side uncoated portion 93' adjacent to the core may not include the segment 93*a*, and the height of the core-side uncoated portion 93' may be smaller than that of other uncoated portion regions. Also, an outer circumferential uncoated portion 93" adjacent to the outer circumferential may not include the segment 93*a*, and the height of the outer circumferential uncoated portion 93" may be smaller than that of other uncoated portion regions.

Optionally, the electrode plate 90 may include an insulating coating layer 94 for covering the boundary between the active material layer 92 and the uncoated portion 93. The insulating coating layer 94 includes an insulating polymer resin, and may optionally include an inorganic filler further. The insulating coating layer 94 prevents the end of the active material layer 92 from coming into contact with the opposite-polarity active material layer opposite thereto through the separator, and serves to structurally support the bending of the segment 93*a*. To this end, when the electrode plate 90 is wound into an electrode assembly, it is preferable that the insulating coating layer 94 is at least partially exposed from the separator to the outside.

Figure 9:
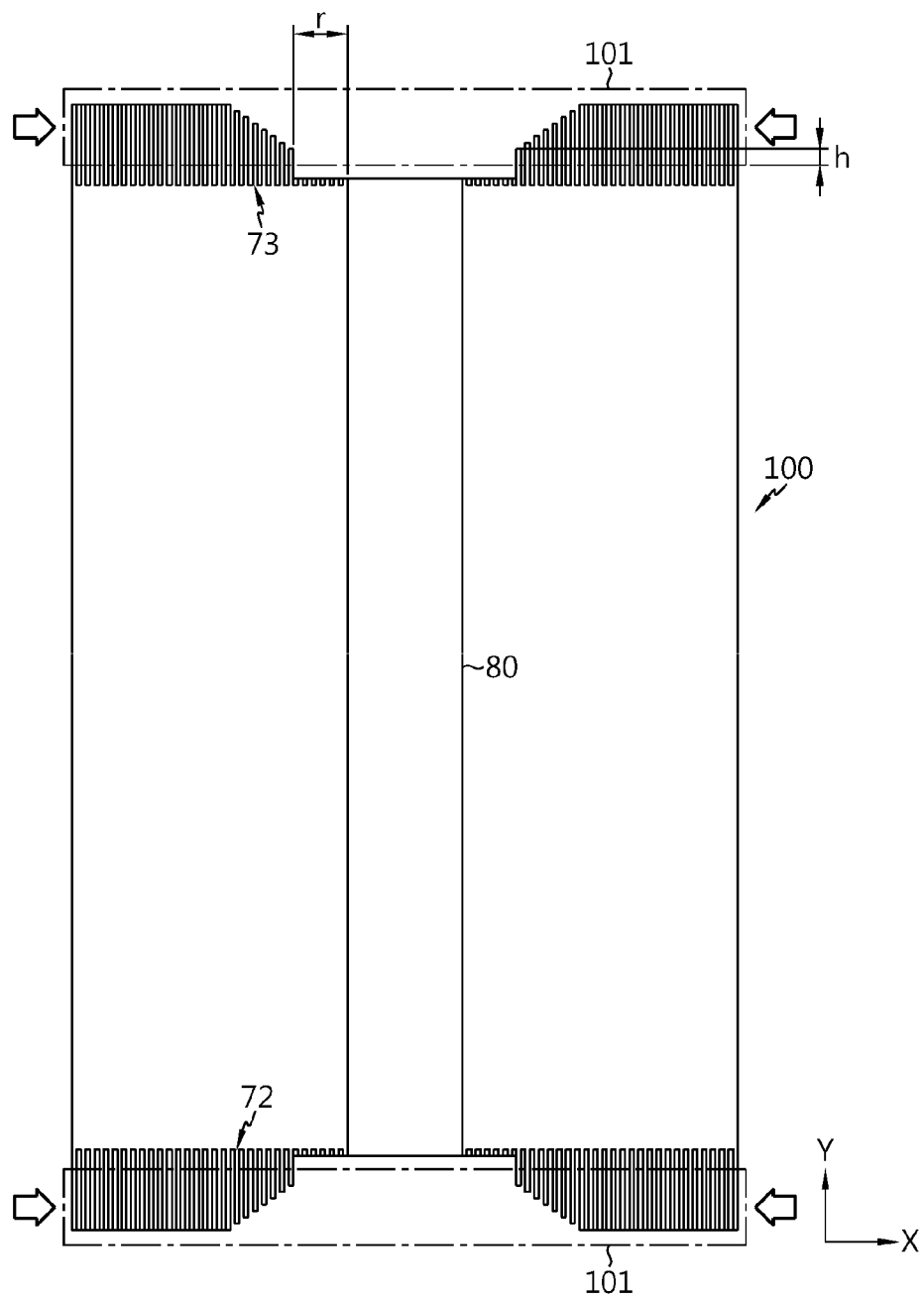
FIG. 9 is a sectional view showing an electrode assembly in which a segment structure of an uncoated portion of the electrode plate according to an embodiment of the present disclosure is applied to a first electrode plate and a second electrode plate, taken along the longitudinal direction (Y).

FIG. 9 is a sectional view showing an electrode assembly 100 in which a segment structure of an uncoated portion of the electrode plate 90 according to an embodiment of the present disclosure is applied to the first electrode plate and the second electrode plate, taken along the longitudinal direction (Y).

Referring to FIG. 9, the electrode assembly 100 may be manufactured by the winding method described with reference to FIG. 2. For convenience of explanation, the protruding structure of the uncoated portions 72, 73 extending out of the separator is illustrated in detail, and the winding structure of the first electrode plate, the second electrode plate and the separator is not illustrated in detail. The uncoated portion 72 protruding downward extends from the first electrode plate, and the uncoated portion 73 protruding upward extends from the second electrode plate.

The pattern in which the heights of the uncoated portions 72, 73 change is schematically shown. That is, the heights of the uncoated portions 72, 73 may vary irregularly depending on the position at which the cross-section is cut. For example, when the side portion of the trapezoidal segment 93*a* is cut, the height of the uncoated portion at the cross section is lower than the height of the segment 93*a*. Accordingly, it should be understood that the heights of the uncoated portions 72, 73 depicted in the drawing showing the cross-section of the electrode assembly 100 correspond to the average of the heights of the uncoated portions included in each winding turn.

Figure 10A:
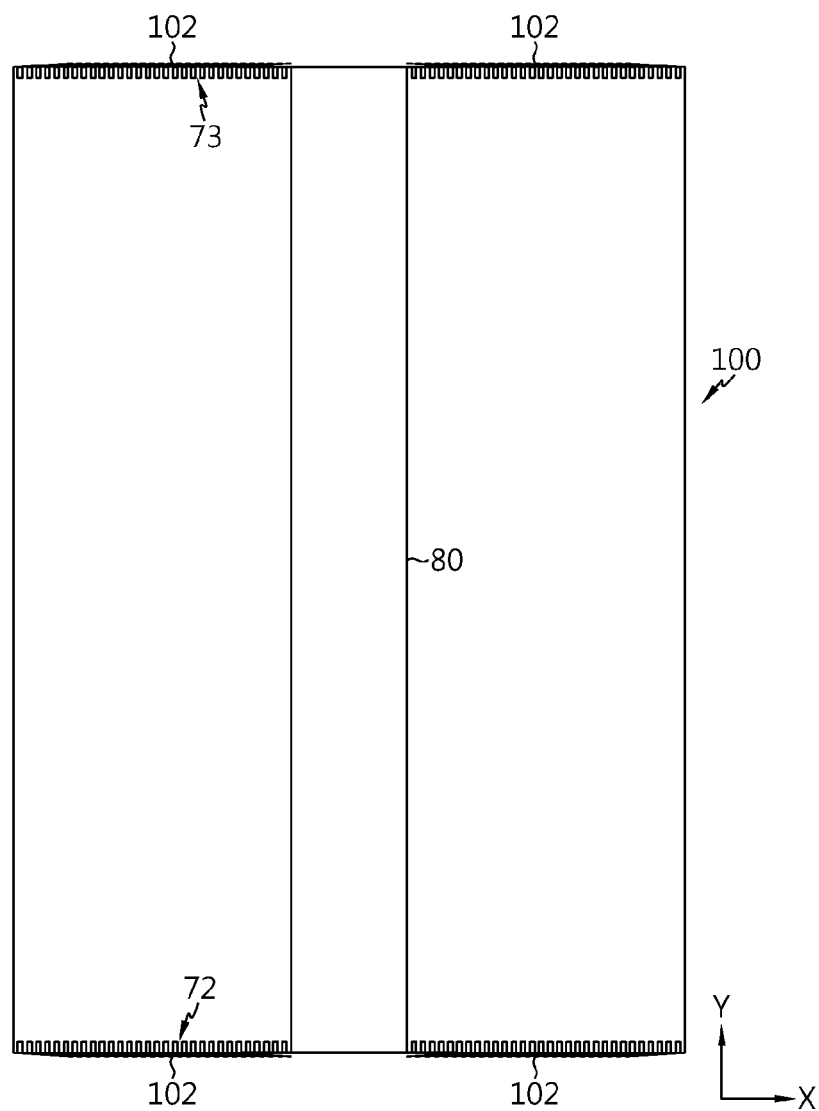
FIG. 10a is a sectional view showing an electrode assembly in which the uncoated portion is bent according to an embodiment of the present disclosure, taken along the longitudinal direction (Y).
Figure 10B:
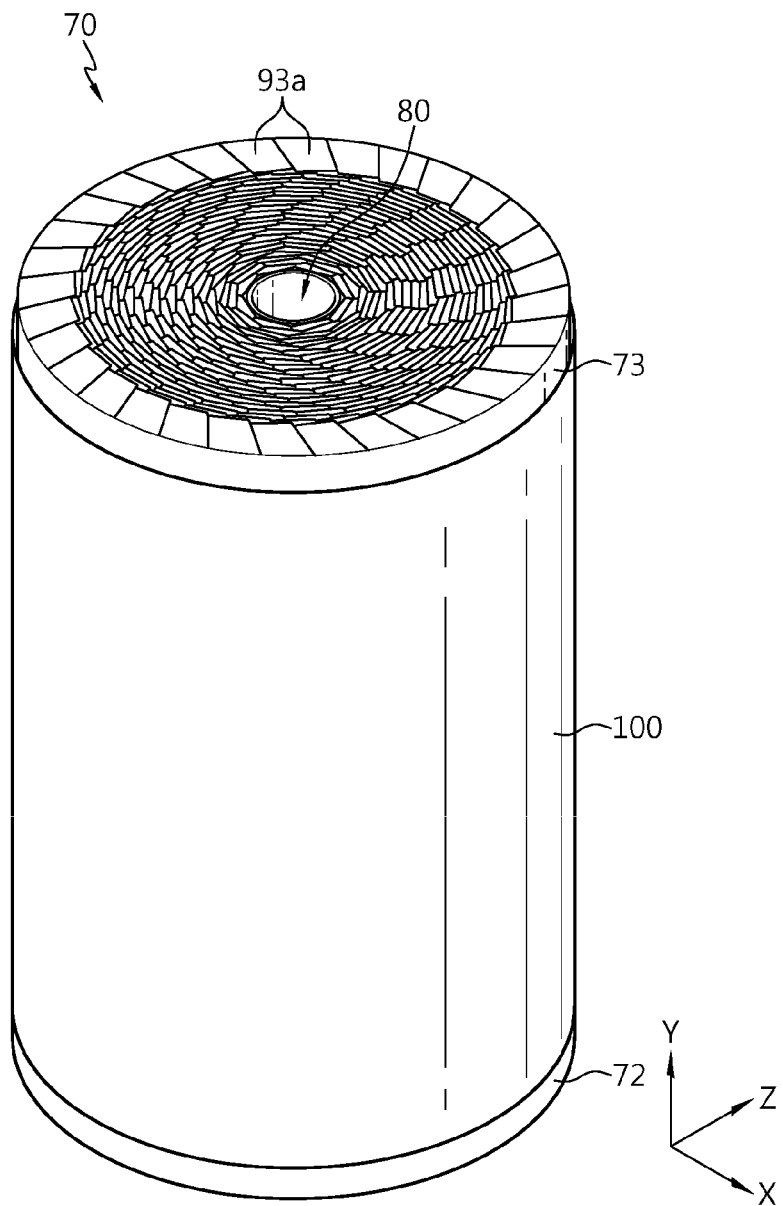
FIG. 10b is a perspective view showing the electrode assembly in which the uncoated portion is bent according to an embodiment of the present disclosure.

The uncoated portions 72, 73 may be bent along the radial direction of the electrode assembly 100, for example from the outer circumference to the core, as shown in FIGS. 10*a* and 10*b*. In FIG. 9, the bent portion 101 is indicated by a dotted line box. When the uncoated portions 72, 73 are bent, bent surfaces 102 are formed at the upper and lower portions of the electrode assembly 100 as the segments adjacent to each other in a radius direction overlap each other in multiple layers. At this time, the core-side uncoated portion 93' (see FIG. 8) is not bent due to its low height, and the height (h) of the segment bent at the innermost side is less than or equal to the radius-direction length (r) of the winding region formed by the core-side uncoated portion 93' with no segment structure. Therefore, the cavity 80 in the core of the electrode assembly 100 is not closed by the bent segments. If the cavity 80 is not closed, there is no difficulty in the electrolyte injection process, and the electrolyte injection efficiency is improved. In addition, the electrode terminal 50 and the second current collecting plate 79 may be easily welded by inserting a welding tool through the cavity 80.

In the cylindrical battery cell 70 according to the embodiment of the present disclosure, the cap plate 74*a* of the sealing body 74 has no polarity. Instead, the first current collecting plate 78 is connected to the sidewall of the battery can 51, so that the outer surface 52*a* of the bottom 52 of the battery can 51 has polarity opposite to the electrode terminal 50. Therefore, when a plurality of cells are to be connected in series and/or in parallel, wiring such as bus bar connection may be performed at the upper portion of the cylindrical battery cell 70 using the electrode terminal 50 and the outer surface 52*a* of the bottom 52 of the battery can 51. Through this, the energy density may be improved by increasing the number of cells that can be mounted in the same space, and the electric wiring work may be performed easily.

Figure 11:
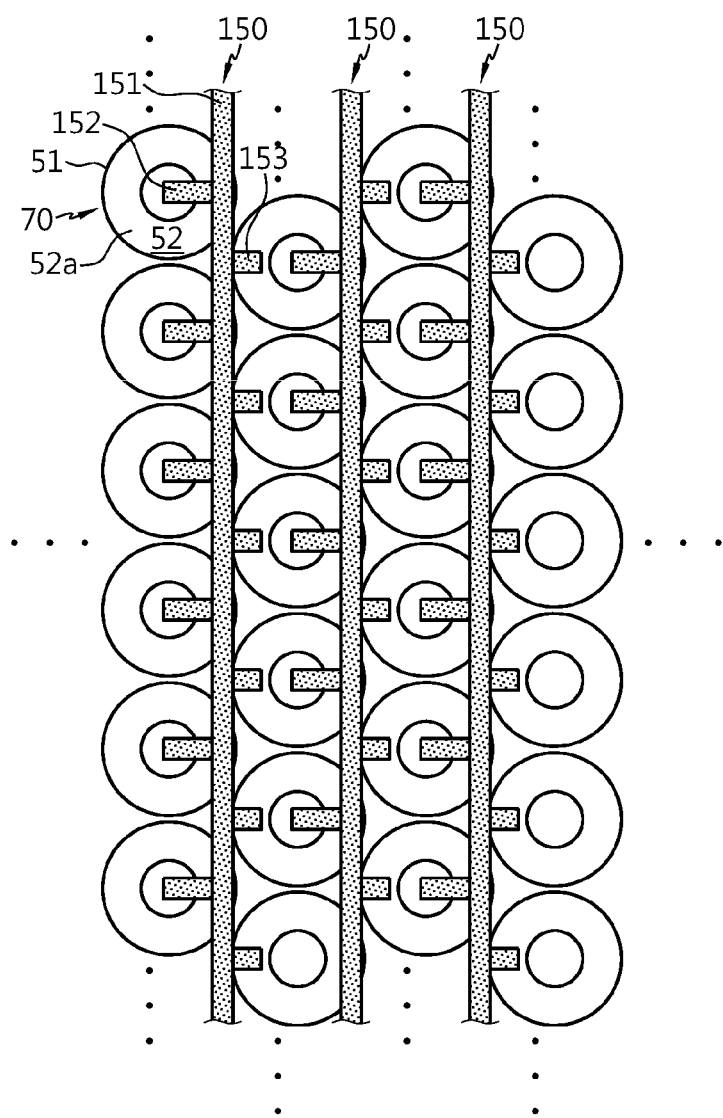
FIG. 11 is a top plan view showing that a plurality of cylindrical battery cells according to an embodiment of the present disclosure are connected in series and in parallel using a bus bar.

FIG. 11 is a diagram showing a state in which the cylindrical battery cells 70 according to an embodiment of the present disclosure are electrically connected using a bus bar 150.

Referring to FIG. 11, the plurality of cylindrical battery cells 70 may be connected in series and in parallel at an upper portion using the bus bar 150. The number of cylindrical battery cells 70 may be increased or decreased in consideration of the capacity of the battery pack.

In each cylindrical battery cell 70, the electrode terminal 50 may have a positive polarity, and the outer surface 52*a* of the bottom 52 of the battery can 51 may have a negative polarity, and vice versa.

Preferably, the plurality of cylindrical battery cells 70 may be arranged in a plurality of columns and rows. Columns are provided in an upper and lower direction with respect to the ground, and rows are provided in a left and right direction with respect to the ground. Also, in order to maximize space efficiency, the cylindrical battery cells 70 may be arranged in a closest packing structure. The closest packing structure is formed when the centers of the electrode terminals 50 form an equilateral triangle when being connected to each other.

Preferably, the bus bar 150 may be disposed above the plurality of battery cells, more preferably between adjacent columns. Alternatively, the bus bar 150 may be disposed between adjacent rows.

Preferably, the bus bar 150 connects cells arranged in the same column in parallel to each other, and serially connects cells arranged in two adjacent columns to each other.

Preferably, for serial and parallel connection, the bus bar 150 may include a body portion 151, a plurality of first bus bar terminals 152 and a plurality of second bus bar terminals 153.

The body portion 151 may extend between electrode terminals (50) of adjacent cylindrical battery cells 70, preferably between columns of the cylindrical battery cells 70. Alternatively, the body portion 151 may extend along a column of cylindrical battery cells 70 and may be regularly bent like a zigzag shape.

The plurality of first bus bar terminals 152 may protrude from one side of the body portion 151 toward the electrode terminal 50 of each cylindrical battery cell 70 and may be electrically coupled to the electrode terminal 50. Electrical coupling with the electrode terminal 50 may be achieved through laser welding, ultrasonic welding, or the like. In addition, the plurality of second bus bar terminals 153 may protrude from the other side of the body portion 151 toward the outer surface 52a of the bottom 52 of the battery can 51 of each cylindrical battery cell 70, and may be electrically coupled to the outer surface 52a. Electrical coupling with the outer surface 52a may be performed by laser welding, ultrasonic welding, or the like.

Preferably, the body portion 151, the plurality of first bus bar terminals 152 and the plurality of second bus bar terminals 153 may be made of one conductive metal plate. The metal plate may be an aluminum plate or a copper plate, but the present disclosure is not limited thereto. In a modified example, the body portion 151, the plurality of first bus bar terminals 152 and the plurality of second bus bar terminals 153 may be manufactured as separate pieces and then coupled to each other through welding or the like.

In the cylindrical battery cell 70 according to the present disclosure, the electrode terminal 50 having a positive polarity and the outer surface 52a of the bottom 52 of the battery can 51 having a negative polarity are located in the same direction, and thus the cylindrical battery cells 70 may be electrically connected easily using the bus bar 150.

In addition, since the electrode terminal 50 and the outer surface 52a of the cylindrical battery cell 70 have a large area, the coupling area of the bus bar 150 may be sufficiently secured to sufficiently reduce the resistance of the battery pack including the cylindrical battery cell 70.

Figure 12A:
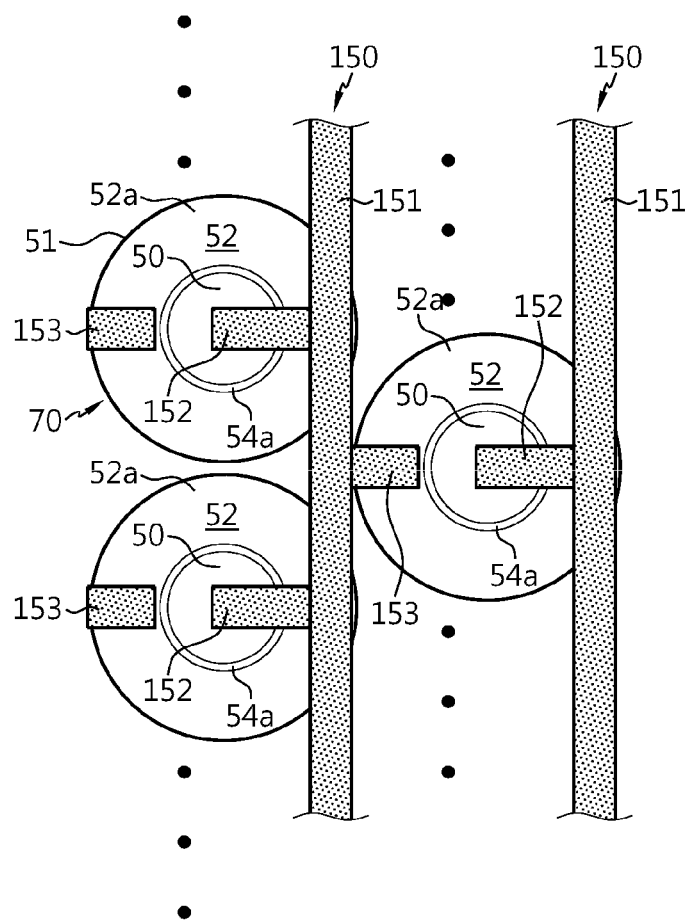
FIG. 12a is a partially enlarged view of FIG. 11.
Figure 12B:
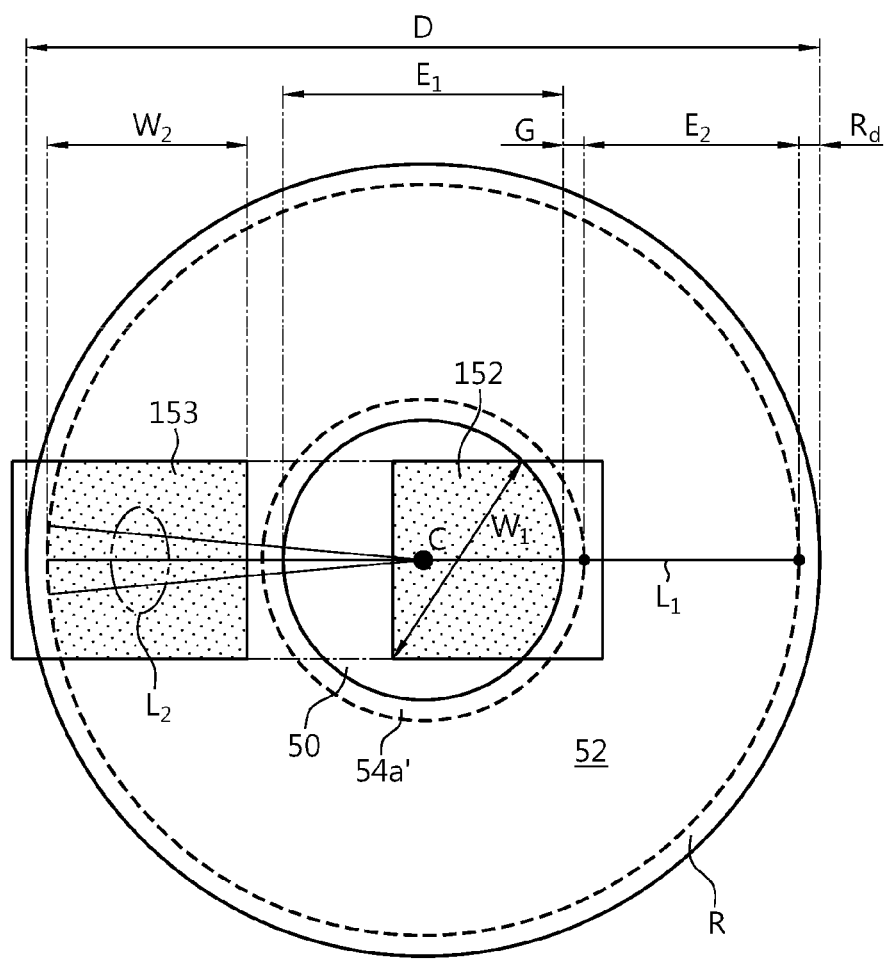
FIGS. 12b and 12c are diagrams exemplarily showing parameters used in defining a diameter of the electrode terminal and an exposure width of an outer surface of a bottom of a battery can according to an embodiment of the present disclosure.
Figure 12C:
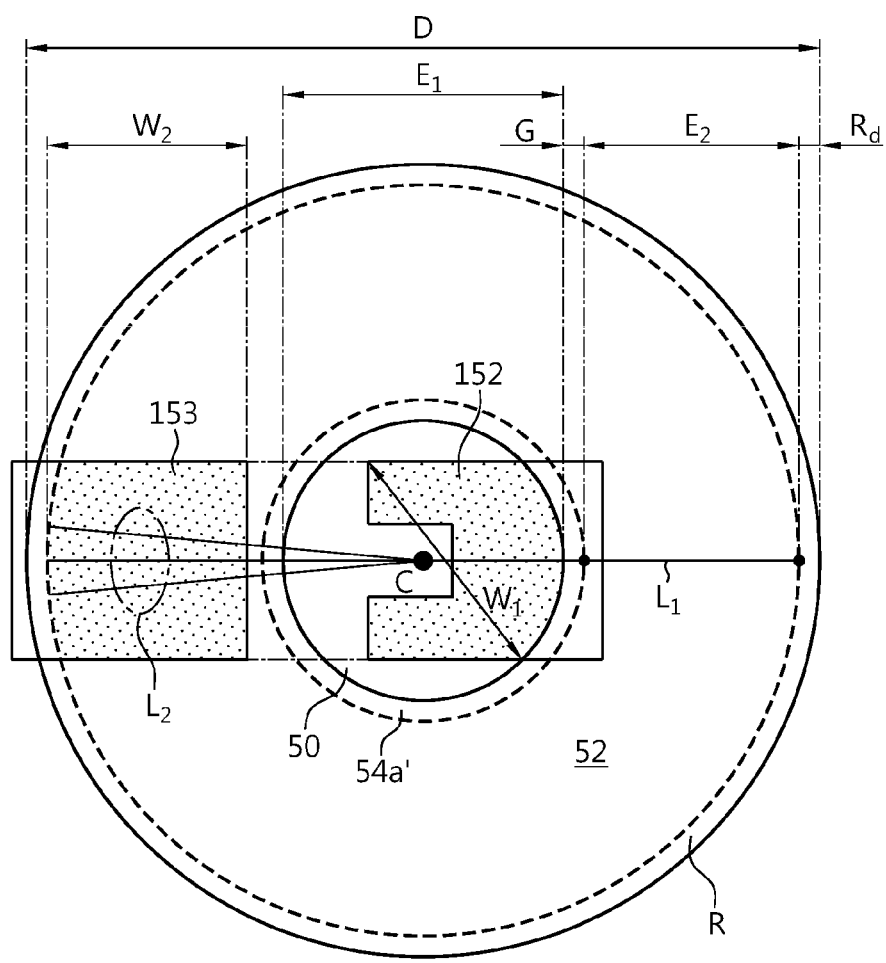

FIG. 12a is a partially enlarged view showing an electrical connection portion between the bus bar 150 and the cylindrical battery cell 70, and FIGS. 12b and 12c are diagrams showing the definition of various parameters to design upper and lower limits of the diameter of the electrode terminal 50 and the exposure width of the outer surface 52a in consideration of the sizes of the bus bar terminals 152, 153.

Referring to FIGS. 12a, 12b and 12c, in the cylindrical battery cell 70, the diameter ($E_1$) of the outer flange portion 50b of the electrode terminal 50 and the width ($E_2$) of the ring-shaped outer surface 52a may be adaptively adjusted in consideration of the dimensions of the contact areas of the bus bar terminals 152, 153.

Here, the width E2 of the outer surface 52a is the width of the exposed surface parallel to the surface of the electrode terminal 50. Specifically, the width E2 of the outer surface 52a is defined as the width of a line segment connecting two points where a linear line ($L_1$) drawn in a radial direction from the center C of the electrode terminal 50 intersects inner and outer boundaries of the outer surface 52a. The width E2 of the outer surface 52a is the width of the flat exposed surface excluding the round region existing at the edge of the bottom 52 and the exposed area 54a' of the outer gasket 54a.

The outer surface of the bottom 52 of the battery can 51 may be divided into the electrode terminal 50, the exposed area 54a' of the rivet gasket 54, and the round region R at the edge of the outer surface 52a when viewed from the top. The round region R is a processing region (see FIGS. 7a and 7b) for smoothly connecting the bottom 52 of the battery can 51 and the sidewall of the battery can 51, and has a width ($R_d$) on a plane.

The first bus bar terminal 152 of the bus bar 150 is branched to one side different from the traveling direction of the body portion 151, and is electrically coupled to the electrode terminal 50. At this time, the electrode terminal 50 and the first bus bar terminal 152 form a first overlapping region (hatched in the drawing) on a plane, and the first overlapping region has a first width ($W_1$). Here, the first overlapping region is a region where the electrode terminal 50 and the first bus bar terminal 152 overlap on a plane.

The first width ($W_1$) is defined as a maximum value among distances between any two points selected in the edge of the first overlapping region. The definition of the first width ($W_1$) is applied identically when the first overlapping region includes the center of the electrode terminal 50 (FIG. 12b) and when the first overlapping region does not include the center of the electrode terminal 50 (FIG. 12c). Referring to FIGS. 12b and 12c, the distance represented by $W_1$ corresponds to a maximum value among distances between any two points selected in the edge of the first overlapping region.

The second bus bar terminal 153 of the bus bar 150 extends in a direction opposite to the first bus bar terminal 152 based on the traveling direction of the body portion 151, and is electrically coupled to the outer surface 52a of the bottom 52 of the battery can 51. At this time, the second bus bar terminal 153 and the outer surface 52a form a second overlapping region (hatched on the figure) on a plane, and the second overlapping region has a second width ($W_2$). Here, the second overlapping region is a region where the outer surface 52a and the second bus bar terminal 153 overlap on a plane.

The second width ($W_2$) is defined as a maximum value among widths between two points where each linear line and the edge of the second overlapping region meet when a plurality of linear lines ($L_3$) are drawn from the center C of the electrode terminal 50 to pass through the second overlapping region.

Preferably, the diameter ($E_1$) of the outer flange portion 50b of the electrode terminal 50 must be at least equal to or greater than the first width ($W_1$) of the first bus bar terminal 152. This is because the first overlapping region of the first bus bar terminal 152 and the electrode terminal 50 must not deviate out of the electrode terminal 50 on the plane. Also, the diameter ($E_1$) of the outer flange portion 50b of the electrode terminal 50 may be increased to the maximum until the distance between the boundary of the electrode terminal 50 and the second bus bar terminal 153 corresponds to the width (G) of the exposed area 54a' of the outer gasket 54a. Therefore, the maximum value of the diameter ($E_1$) of the outer flange portion 50b of the electrode terminal 50 is 'D−2*$R_d$−2*G−2*$W_2$'.

Preferably, the width ($E_2$) of the outer surface 52a is a factor dependent on the diameter ($E_1$) of the outer flange portion 50b of the electrode terminal 50, and must be at least equal to or greater than the second width ($W_2$) of the second bus bar terminal 153. Only in this case, an overlapping region of the second bus bar terminal 153 and the outer surface 52a may be formed. In addition, the width ($E_2$) of the outer surface 52a may be increased to the maximum up to 50% of 'D−2*$R_d$−2*G−$E_1$', which is a value obtained by subtracting the diameter ($E_1$) of the outer flange portion 50b of the electrode terminal 50, the width (2*G) of the exposed area of the outer gasket 54a, and the width (2*$R_d$) of the round region from the outer diameter (D) of the battery can 51.

In conclusion, in the cylindrical battery cell 70 according to the present disclosure, it is preferable that the diameter ($E_1$) of the outer flange portion 50b of the electrode terminal 50 and the width ($E_2$) of the outer surface 52a are designed to satisfy the following relational expression.

$$W_1 \leq E_1 \leq D - 2R_d - 2G - 2W_2$$

$$E_2 = 0.5 * (D - 2R_d - 2G - E_1)$$

($E_1$: diameter of the outer flange portion 50b of the electrode terminal 50, $E_2$: width of the outer surface 52a, D: outer diameter of the battery can 51, $R_d$: width of the round region R measured on a plane, G: width of the exposed area 54a' of the outer gasket 54a, $W_1$: width of the first bus bar terminal 152, $W_2$: width of the second bus bar terminal 153)

In a specific example, when D is 46 mm, $W_1$ and $W_2$ are 6 mm, G is 0.5 mm, and R is 1 mm, the diameter ($E_1$) of the outer flange portion 50b of the electrode terminal 50 is 6 mm to 31 mm, and the width ($E_2$) of the outer surface 52a is 6 mm to 18.5 mm.

As another example, when D is 46 mm, $W_1$ and $W_2$ are 6 mm, G is 0.5 mm and $R_d$ is 1.5 mm, the diameter ($E_1$) of the outer flange portion 50b of the electrode terminal 50 is 6 mm to 30 mm and the width ($E_2$) of the outer surface 52a is 6 mm to 18 mm.

As described above, the cylindrical battery cell 70 of the present disclosure has a structure in which resistance is minimized by expanding a welding area through a bent surface of the uncoated portion, multiplexing a current path by using a first current collecting plate, minimizing a current path length, and the like. The AC resistance of the cylindrical battery cell 70 measured using a resistance measuring instrument between the electrode terminal 50 (positive-polarity terminal) and the outer surface 52a (negative-polarity terminal) near the electrode terminal 50 may be about 4 milliohms (mohm) or less, which is appropriate to quick charging.

In the present disclosure, a positive electrode active material coated on the positive electrode plate and a negative electrode active material coated on the negative electrode plate may employ any active material known in the art without limitation.

In one example, the positive electrode active material may include an alkali metal compound expressed by a general formula $A[A_xM_y]O_{2+z}$ (A includes at least one element among Li, Na and K; M includes at least one element selected from is Ni, Co, Mn, Ca, Mg, Al, Ti, Si, Fe, Mo, V, Zr, Zn, Cu, Al, Mo, Sc, Zr, Ru, and Cr; $x \geq 0$, $1 \leq x+y \leq 2$, $-0.1 \leq z \leq 2$; and the stoichiometric coefficients x, y and z are selected so that the compound maintains electrical neutrality).

In another example, the positive electrode active material may be an alkali metal compound $xLiM^1O_2$-(1-x)$Li_2M^2O_3$ disclosed in U.S. Pat. Nos. 6,677,082, 6,680,143, et al., wherein $M^1$ includes at least one element having an average oxidation state 3; $M^2$ includes at least one element having an average oxidation state 4; and $0 \leq x \leq 1$).

In still another example, the positive electrode active material may be lithium metal phosphate expressed by a general formula $Li_aM^1{}_xFe_{1-x}M^2{}_yP_{1-y}M^3{}_zO_{4-z}$ ($M^1$ includes at least one element selected from the Ti, Si, Mn, Co, Fe, V, Cr, Mo, Ni, Nd, Al, Mg and Al; $M^2$ includes at least one element selected from Ti, Si, Mn, Co, Fe, V, Cr, Mo, Ni, Nd, Al, Mg, Al, As, Sb, Si, Ge, V and S; $M^3$ includes a halogen element optionally including F; $0<a \leq 2$, $0 \leq x \leq 1$, $0 \leq y<1$, $0 \leq z<1$; the stoichiometric coefficients a, x, y and z are selected so that the compound maintains electrical neutrality), or $Li_3M_2(PO_4)_3$ (M includes at least one element selected from Ti, Si, Mn, Fe, Co, V, Cr, Mo, Ni, Al, Mg and Al).

Preferably, the positive electrode active material may include primary particles and/or secondary particles in which the primary particles are aggregated.

In one example, the negative electrode active material may employ carbon material, lithium metal or lithium metal compound, silicon or silicon compound, tin or tin compound, or the like. Metal oxides such as $TiO_2$ and $SnO_2$ with a potential of less than 2V may also be used as the negative electrode active material. As the carbon material, low-crystalline carbon and/or high-crystalline carbon may be used.

The separator may employ a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, or the like, or laminates thereof. As another example, the separator may employ a common porous nonwoven fabric, for example, a nonwoven fabric made of high melting point glass fiber, polyethylene terephthalate fiber, or the like.

A coating layer of inorganic particles may be included in at least one surface of the separator. It is also possible that the separator itself is made of a coating layer of inorganic particles. Particles in the coating layer may be coupled with a binder so that an interstitial volume exists between adjacent particles.

The inorganic particles may be made of an inorganic material having a dielectric constant of 5 or more. As a non-limiting example, the inorganic particles may include at least one material selected from the group consisting of Pb(Zr,Ti)$O_3$ (PZT), $Pb_{1-x}La_xZr_{1-y}Ti_yO_3$ (PLZT), $PB(Mg_3Nb_{2/3})O_3$-$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO and $Y_2O_3$.

The electrolyte may be a salt having a structure like $A^+B^-$. Here, $A^+$ includes an alkali metal cation such as $Li^+$, $Na^+$, or $K^+$, or a combination thereof and $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may also be dissolved in an organic solvent. The organic solvent may employ propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

The cylindrical battery cell 70 according to the above embodiment may be used to manufacture a battery pack.

Figure 13:
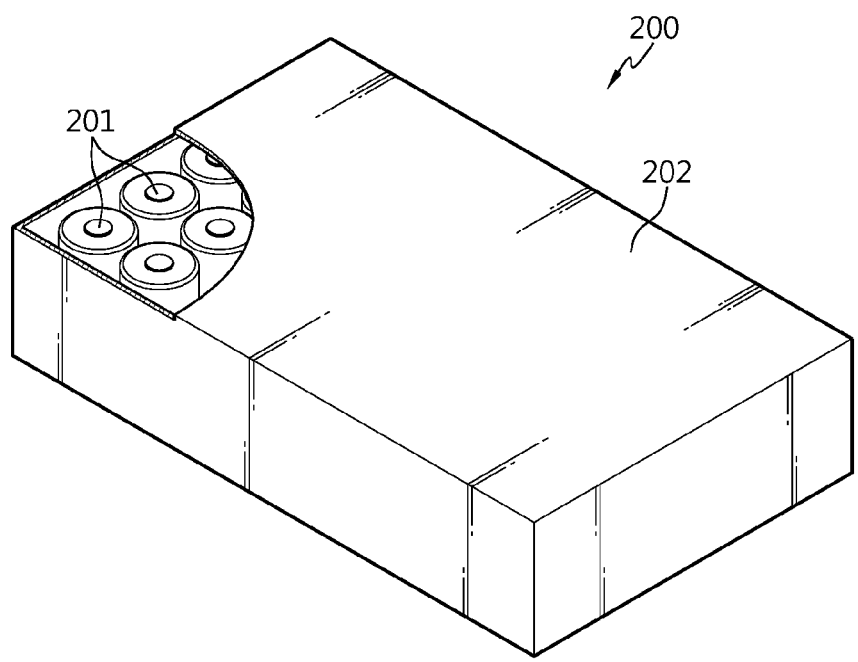
FIG. 13 is a diagram showing a schematic configuration of a battery pack including the cylindrical battery cells according to an embodiment of the present disclosure.

FIG. 13 is a diagram schematically showing a battery pack according to an embodiment of the present disclosure.

Referring to FIG. 13, a battery pack 200 according to an embodiment of the present disclosure includes an aggregate in which cylindrical battery cells 201 are electrically connected, and a pack housing 202 for accommodating the aggregate. The cylindrical battery cell 201 is the battery cell according to the above embodiment. In the drawing, components such as a bus bar, a cooling unit, and an external terminal for electrical connection of the cylindrical battery cells 201 are not depicted for convenience of illustration.

The battery pack 200 may be mounted to a vehicle. The vehicle may be, for example, an electric vehicle, a hybrid electric vehicle, or a plug-in hybrid vehicle. The vehicle includes a four-wheeled vehicle or a two-wheeled vehicle.

Figure 14:
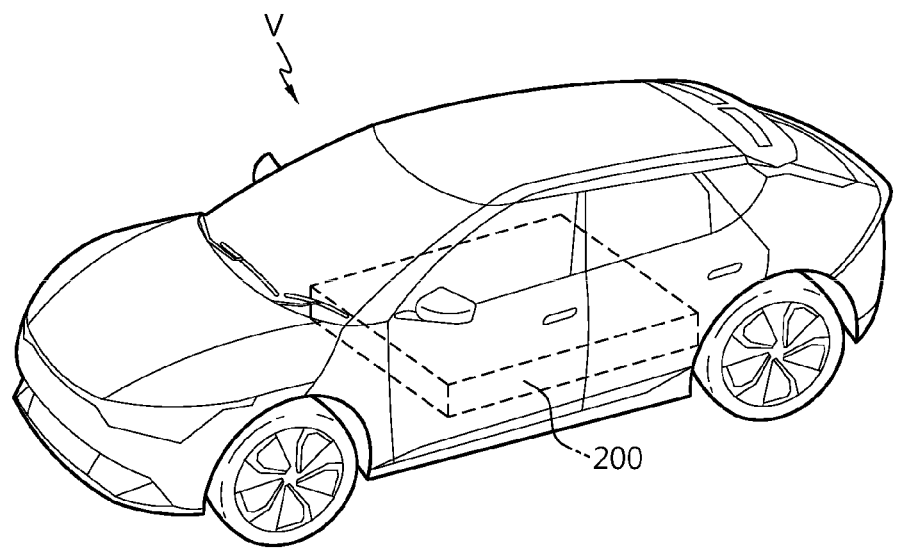
FIG. 14 is a diagram showing a schematic configuration of a vehicle including the battery pack according to an embodiment of the present disclosure.

FIG. 14 is a diagram for illustrating a vehicle including the battery pack 200 of FIG. 13.

Referring to FIG. 14, a vehicle V according to an embodiment of the present disclosure includes the battery pack 200 according to an embodiment of the present disclosure. The vehicle V operates by receiving power from the battery pack 200 according to an embodiment of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A riveting structure of an electrode terminal for a battery, the riveting structure comprising:
    a battery housing having a bottom;
    an electrode terminal riveted through a hole formed in the bottom of the battery housing; and
    a gasket between the electrode terminal and the battery housing,
    wherein the electrode terminal includes:
        a body portion inserted into the hole;
        an outer flange portion extending along an outer surface of the bottom of the battery housing in a width direction from a first side of the body portion exposed through the outer surface;
        an inner flange portion extending toward an inner surface of the bottom of the battery housing from a second side of the body portion exposed through the inner surface;
        a flat portion on the second side of the body portion; and
        a recess exposed between the inner flange portion and the flat portion in the width direction.

2. The riveting structure of the electrode terminal according to claim 1, wherein an angle between the inner flange portion and the inner surface of the bottom of the battery housing is in a range of 2° to 60°.

3. The riveting structure of the electrode terminal according to claim 1, wherein the recess has an asymmetric cross section.

4. The riveting structure of the electrode terminal according to claim 3, wherein the asymmetric cross section of the recess includes a sidewall and an inclined surface of the inner flange portion connected to an end of the sidewall.

5. The riveting structure of the electrode terminal according to claim 1, wherein the inner flange portion has a gradually decreasing thickness in a direction extending away from the body portion.

6. The riveting structure of the electrode terminal according to claim 1, wherein the gasket includes:
    an outer gasket between the outer flange portion and the outer surface of the bottom of the battery housing; and
    an inner gasket between the inner flange portion and the inner surface of the bottom of the battery housing,
    wherein the inner gasket has a varying thickness.

7. The riveting structure of the electrode terminal according to claim 6, wherein the inner gasket extends radially outwardly further than the inner flange portion.

8. The riveting structure of the electrode terminal according to claim 6, wherein a height of the flat portion is equal to or larger than a height of an end of the inner gasket based on the inner surface of the bottom of the battery housing.

9. The riveting structure of the electrode terminal according to claim 1, wherein a height of the flat portion is equal to or larger than a height of the inner flange portion based on the inner surface of the bottom of the battery housing.

10. The riveting structure of the electrode terminal according to claim 1, wherein a radius from a center of the body portion to an edge of the outer flange portion is 10% to 70% of a radius of the bottom of the battery housing.

11. The riveting structure of the electrode terminal according to claim 1, wherein a radius from a center of the body portion to an edge of the flat portion is 4% to 30% of a radius of the bottom of the battery housing.

12. A battery, comprising:
    an electrode assembly comprising a first electrode and a second electrode wound with a separator therebetween, wherein each of the first electrode and the second electrode has a first portion coated with an active material, and a second portion, and wherein the second portion of the first electrode and the second portion of the second electrode are extended from opposite ends of the electrode assembly and exposed to the outside of the separator;
    a battery housing accommodating the electrode assembly and electrically connected to the first electrode, the battery housing having a first end with a first opening and a second end opposite the first end;
    an electrode terminal riveted through a hole formed in the second end of the battery housing and electrically connected to the second electrode, the electrode terminal including:
        a body portion inserted into the hole;
        an outer flange portion extending from the body portion in a width direction along an outer surface of the second end of the battery housing from a first side of the body portion exposed through the outer surface;
        an inner flange portion extending toward an inner surface of the second end of the battery housing from a second side of the body portion exposed through the inner surface;
        a flat portion in the second side of the body portion; and
        a recess exposed between the inner flange portion and the flat portion in the width direction;

a gasket between the electrode terminal and the battery housing; and a sealing body sealing the first opening of the first end of the battery housing.

13. The battery according to claim 12, wherein the battery housing includes a beading portion formed in a region adjacent to the first end of the battery housing which is pressed-in into the battery housing, and wherein the sealing body includes a cap having no polarity and a sealing gasket between an edge of the cap and the first end of the battery housing.

14. The battery according to claim 13, wherein the battery housing further includes a crimping portion extended and bent into the inside of the battery housing to surround and fix the edge of the cap together with the sealing gasket.

15. The battery according to claim 13, further comprising:
a first current collecting unit coupled to the second portion of the first electrode; and
a second current collecting unit coupled to the second portion of the second electrode plate,
wherein at least a part of an edge of the first current collecting unit not in contact with the second portion of the first electrode is between the beading portion and the sealing gasket and fixed by the crimping portion, and
wherein at least a part of the second current collecting unit is coupled to the flat portion of the electrode terminal.

16. The battery according to claim 15, wherein at least a part of the edge of the first current collecting unit is fixed to an inner circumference of the beading portion adjacent to the crimping portion by welding.

17. The battery according to claim 12, wherein the gasket includes:
an outer gasket between the outer flange portion and the outer surface of the second end of the battery housing; and
an inner gasket between the inner flange portion and the inner surface of the second end of the battery housing.

18. The battery according to claim 17, wherein an end of the inner gasket is exposed to the outside of the inner flange portion.

19. The battery according to claim 12, wherein a first bus bar terminal is electrically coupled to a surface of the electrode terminal, and a second bus bar terminal is electrically coupled to the outer surface of the second end of the battery housing.

20. The battery according to claim 19, wherein the first bus bar terminal overlaps with the electrode terminal on a plane to form a first overlapping region, and the second bus bar terminal overlaps with the outer surface of the second end of the battery housing to form a second overlapping region, and
wherein a diameter of the electrode terminal and a width of the outer surface of the second end of the battery housing satisfy the following relational expression, $$W_1 \leq E_1 \leq D - 2R_d - 2G - 2W_2$$

$$E_2 = 0.5*(D - 2R_d - 2G - E_1)$$

where $E_1$ is a diameter of the outer flange portion of the electrode terminal, $E_2$ is a width of an exposed surface parallel to a surface of the electrode terminal in the outer surface of the second end of the battery housing, D is a diameter of the battery housing, $R_d$ is a width of a round region at an edge of the battery housing measured on a plane, G is an exposure width of the outer gasket through an edge of the electrode terminal, $W_1$ is a maximum value among distances between any two points selected in an edge of the first overlapping region, and $W_2$ is a maximum value among distances between two points where a plurality of linear lines passing through the center of the electrode terminal meet an edge of the second overlapping region.

21. The battery according to claim 12, wherein a ratio of a diameter of the battery to a height of the battery is greater than 0.4.

22. A battery pack, comprising a plurality of batteries according to claim 12.

23. The battery pack according to claim 22, wherein the plurality of batteries are arranged in a predetermined number of columns, and
wherein the electrode terminal and the outer surface of the second end of the battery housing of each battery of the plurality of batteries are disposed to face upward.

24. The battery pack according to claim 23, further comprising:
a plurality of bus bars connecting the plurality of batteries in series and in parallel,
wherein the plurality of bus bars are disposed above the plurality of batteries, and
wherein each bus bar of the plurality of bus bars includes:
a body extending between electrode terminals of adjacent batteries;
a plurality of first bus bar terminals respectively extending in one side direction from the body and electrically coupled to the electrode terminal of the battery located in the one side direction; and
a plurality of second bus bar terminals respectively extending in the other side direction from the body and electrically coupled to the outer surface of the second end of the battery housing of the battery located in the other side direction.

25. A vehicle, comprising at least one battery pack according to claim 22.

26. An electrode terminal for a battery, comprising:
a body having a top surface, a lower surface and an outer surface extending in an axial direction;
an outer flange extending in a width direction from the outer surface of the body and configured to extend along an outer surface of a bottom of a battery housing;
an inner flange extending from the outer surface of the body, the inner flange being above the outer flange,
wherein the top surface of the body contacts a current collecting unit; and
a recess exposed between the inner flange and the top surface of the body in the width direction.

27. The electrode terminal of claim 26, wherein the top surface of the body is above the inner flange.

28. The electrode terminal of claim 26, wherein the top surface of the body is flat.

29. The electrode terminal of claim 26, wherein the recess has a first surface formed by the outer surface of the body and a second surface formed by an upper surface of the inner flange, and
wherein the first surface and second surface are asymmetrical.

30. The electrode terminal of claim 26, wherein an angle between the inner flange and the outer flange is between 2° to 60°.

31. The riveting structure of the electrode terminal according to claim 1, wherein the recess has an acute angle formed by an inner surface of the inner flange portion and a sidewall of the body portion.

* * * * *